(12) United States Patent
Hwang et al.

(10) Patent No.: US 9,571,318 B2
(45) Date of Patent: Feb. 14, 2017

(54) TRANSMITTING APPARATUS, RECEIVING APPARATUS, AND METHOD OF CONTROLLING THE SAME

(71) Applicant: SAMSUNG ELECTRONICS CO., LTD., Suwon-si (KR)

(72) Inventors: Sung-hee Hwang, Suwon-si (KR); Hyun-koo Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 14/498,235

(22) Filed: Sep. 26, 2014

(65) Prior Publication Data

US 2015/0092883 A1    Apr. 2, 2015

Related U.S. Application Data

(60) Provisional application No. 61/883,296, filed on Sep. 27, 2013.

(30) Foreign Application Priority Data

Apr. 16, 2014    (KR) ........................ 10-2014-0045554

(51) Int. Cl.
| | |
|---|---|
| *H04L 27/26* | (2006.01) |
| *H04H 20/33* | (2008.01) |
| *H04L 1/00* | (2006.01) |
| *H04N 21/2343* | (2011.01) |
| *H04N 19/30* | (2014.01) |
| *H04N 21/2362* | (2011.01) |
| *H04N 21/2383* | (2011.01) |
| *H04N 21/438* | (2011.01) |

(52) U.S. Cl.
CPC .......... *H04L 27/2602* (2013.01); *H04H 20/33* (2013.01); *H04L 1/0052* (2013.01); *H04N 19/30* (2014.11); *H04N 21/2362* (2013.01); *H04N 21/2383* (2013.01); *H04N 21/234327* (2013.01); *H04N 21/438* (2013.01)

(58) Field of Classification Search
CPC ............... H04L 27/2602; H04L 1/0052; H04N 21/2383; H04N 21/438; H04N 21/2362; H04N 19/30; H04N 21/234327; H04H 20/33
USPC ............... 370/351, 389, 392, 431, 432, 464, 465,370/470, 471, 473, 474
See application file for complete search history.

(56) References Cited

U.S. PATENT DOCUMENTS

2002/0154697 A1* 10/2002 Jeon ..................... H04N 19/619
                                                                        375/240.16
2005/0233710 A1* 10/2005 Lakkis ............... H04B 1/71632
                                                                            455/102

(Continued)

*Primary Examiner* — Obaidul Huq
(74) *Attorney, Agent, or Firm* — Sughrue Mion, PLLC

(57) ABSTRACT

Provided are a transmitting apparatus, a receiving apparatus and methods of controlling the transmission and reception. The transmitting apparatus includes: a baseband packet generator configured to, in response to input of data, generate a baseband packet for mapping the data with a physical layer; a baseband frame generator configured to generate a baseband frame including the baseband packet; a signal processor configured to signal-process the baseband frame; and a transmitter configured to transmit the baseband frame after the signal processing, wherein the baseband packet includes signaling information which indicates that the data comprises at least one of base layer data and enhancement layer data.

17 Claims, 22 Drawing Sheets

(56) References Cited

U.S. PATENT DOCUMENTS

2011/0002397 A1* 1/2011 Wang ..................... H04N 19/70
 375/240.26
2012/0082076 A1* 4/2012 Kim ............... H04N 21/234327
 370/310

* cited by examiner

FIG. 6

```
Multi_Layered Media ID = XXX
Number of Layered Media = N
Multi_Layered Media Information

- For (i=0; i<N; i++) {

PLP_ID
Frame_ID
RF Frequency
    }
```

1420

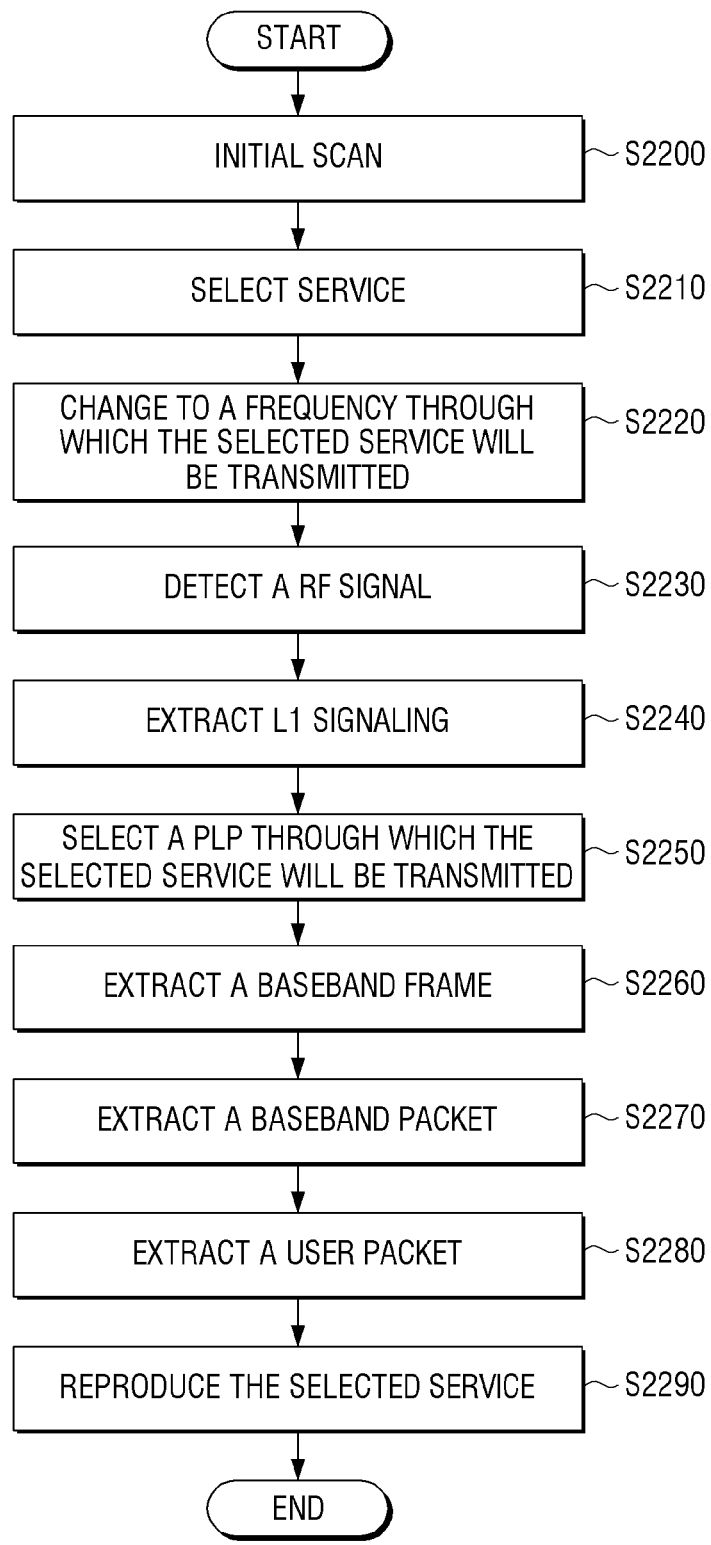

TRANSMITTING APPARATUS, RECEIVING APPARATUS, AND METHOD OF CONTROLLING THE SAME

CROSS-REFERENCE TO THE RELATED APPLICATIONS

This application claims priority from Korean Patent Application No. 10-2014-0045554 filed on Apr. 16, 2014 in the Korean Intellectual Property Office, and U.S. Provisional Application No. 61/883,296 filed on Sep. 27, 2013 in the United States Patent and Trademark Office, the disclosures of which are incorporated herein by reference in their entirety.

BACKGROUND

1. Field

Apparatuses and methods consistent with exemplary embodiments relate to a transmitting apparatus which adopts an Orthogonal Frequency Division Multiplexing (OFDM) method, a receiving apparatus, and the methods of controlling the same.

2. Description of the Related Art

A recent broadcast communication service is characterized by multi-functions, wideband, and high quality transmission and reception. In particular, with the development of electronic technologies, a portable broadcasting device, such as a high-definition digital television (HDTV), a high-end smart phone, etc., has become widely in use. Accordingly, there is an increasing demand for broadcasting services which support various reception methods.

To meet such demand, as an example, a broadcast communication standard, such as the Digital Video Broadcasting the Second Generation Terrestrial (DVB-T2) has been developed. The DVB-T2 refers to a second generation European terrestrial digital broadcasting standard the performance of which has been improved from the DVB-T which is adopted as a standard in more than 35 countries in the world including Europe. For the DVB-T2, the transmission capacity and high bandwidth efficiency have been improved by applying technologies such as Low Density Parity Check (LDPC) coding and 256 QAM modulation methods. Accordingly, the DVB-T2 has an advantage of providing various high quality services, such as HDTV services, in a limited band.

In addition, with the development of a mobile network and popularization of a smart phone, there is a need for a physical standard of a terrestrial broadcasting including mobile broadcasting. HD content services were capable of being received through only a TV in a domestic environment, but with the development of a network, a user is able to receive HD content services through a mobile device.

Also, with the development of a large-volume content (for example, ultra high-definition (UHD) service), it is required to transmit a multi-layer content including a physical layer for a small-volume content and a physical layer for a large-volume content, in order to secure compatibility between a device receiving the existing content, that is, a small-volume content and a device receiving a large-volume content.

SUMMARY

In the past, a multi-layer content was transmitted after being identified and made into a single stream in an upper layer, and thus, in a physical layer, it is not possible to know existence of the multi-layer content. Accordingly, a physical layer of a device which is to play back only a small-volume content decoded substantially both of a small-volume content and a large-volume content and transmitted the contents to an upper layer, and then the upper layer identified the small-volume content and the large-volume content. Thus, there was a problem that the physical layer decodes even unnecessary data.

For this reason, there is an increasing demand for a method of identifying a multi-layer content in a physical layer and a method of transmitting and receiving the same.

Exemplary embodiments of the inventive concept are provided to address the aforementioned and other problems and disadvantages occurring in the related art, and an aspect of the exemplary embodiments provides a transmitting apparatus which is capable of transmitting a multi-layer content effectively in physical layer, a receiving apparatus, and the methods of controlling the same.

A transmitting apparatus according to an exemplary embodiment includes: a baseband packet generator configured to, in response to input of data, generate a baseband packet for mapping the data with a physical layer; a baseband frame generator configured to generate a baseband frame including the baseband packet; a signal processor configured to signal-process the baseband frame; and a transmitter configured to transmit the baseband frame after the signal processing, wherein the baseband packet includes signaling information which indicates that the data comprises at least one of base layer data and enhancement layer data.

Here, the signaling information may include information which indicates whether the baseband frame including at least one of the base layer data and the enhancement layer data is a frame for supporting a mobile device or a frame for supporting a fixed device.

The signaling information may include at least one of information on whether the base layer data and the enhancement layer data exist, information on a number of layers where the data exist, and information required for identifying the base layer data and the enhancement layer data.

The signaling information may include frequency band information corresponding to each of the base layer data and the enhancement layer data.

In addition, the signaling information may be L2 signaling information.

The transmitting apparatus may further include an information inserter configured to insert L1 signaling information in a signaling area of the baseband frame. In addition, the L1 signaling information may include information on a location where the base layer data and the enhancement layer data are inserted in the baseband frame and parameter information on each of the base layer data and the enhancement layer data.

In this case, the parameter information may include at least one of an Orthogonal Frequency Division Multiplexing (OFDM) fast Fourier transform (FFT) size, a guard interval (GI), a constellation order, and a forward error correction (FEC) code rate.

A receiving apparatus according to an exemplary embodiment includes: a receiver configured to receive a baseband frame comprising a baseband packet; an information extractor configured to extract the baseband packet from the baseband frame; and a signal processor configured to signal-process the baseband frame based on signaling information included in the baseband packet, wherein the signaling information indicates that the baseband frame comprises at least one of base layer data and enhancement layer data.

The signal processor determines whether the baseband frame includes the base layer data and the enhancement layer data based on the signaling information, and signal-processes each of the base layer data and the enhancement layer data based on L1 signaling information included in a signaling area of the baseband frame. In addition, the L1 signaling information may include information on a location where the base layer data and the enhancement layer data are inserted in the baseband frame and parameter information on each of the base layer data and the enhancement layer data.

The signaling information may include information which indicates whether the baseband frame including at least one of the base layer data and the enhancement layer data is a frame for supporting a mobile device or a frame for supporting a fixed device.

In addition, the signaling information may include at least one of information on whether the base layer data and the enhancement layer data exist, information on a number of layers where the data exist, and information required for identifying the base layer data and the enhancement layer data.

In addition, the signaling information may include frequency band information corresponding to each of the base layer data and the enhancement layer data.

The signaling information may be L2 signaling information.

A method of controlling a transmitting apparatus according to an exemplary embodiment includes: in response to input of data, generating a baseband packet for mapping the data with a physical layer; generating a baseband frame comprising the baseband packet; signal processing the baseband frame; and transmitting the baseband frame after the signal processing, wherein the baseband packet comprises signaling information which indicates that the data comprises at least one of base layer data and enhancement layer data.

In this case, the signaling information may include information indicating whether the baseband frame including at least one of the base layer data and the enhancement layer data is a frame for supporting a mobile device or a frame for supporting a fixed device.

The signaling information may include at least one of information on whether the base layer data and the enhancement layer data exist, information on a number of layers, and information required for identifying the base layer data and the enhancement layer data.

The signaling information may include frequency band information corresponding to each of the base layer data and the enhancement layer data.

In addition, the signaling information may be L2 signaling information.

The method may further include inserting L1 signaling information in a signaling area of the baseband frame. In addition, the L1 signaling information may include information on a location where the base layer data and the enhancement layer data are inserted in the baseband frame and parameter information on each of the base layer data and the enhancement layer data.

In this case, the parameter information may include at least one of an OFDM FFT size, a GI, a constellation order, and an FEC code rate.

A method of controlling a receiving apparatus according to an exemplary embodiment includes: receiving a baseband frame comprising a baseband packet; extracting the baseband packet from the baseband frame; and signal processing the baseband frame based on signaling information included in the baseband packet, wherein the signaling information indicates that the baseband frame comprises at least one of base layer data and enhancement layer data.

The signal processing may include determining whether the baseband frame includes the base layer data and the enhancement layer data based on the signaling information, and signal processing each of the base layer data and the enhancement layer data based on L1 signaling information included in a signaling area of the baseband frame. In addition, the L1 signaling information may include information on a location where the base layer data and the enhancement layer data are inserted in the baseband frame and parameter information on each of the base layer data and the enhancement layer data.

The signaling information may include information which indicates whether the baseband frame including at least one of the base layer data and the enhancement layer data is a frame for supporting a mobile device or a frame for supporting a fixed device.

In addition, the signaling information may include at least one of information on whether the base layer data and the enhancement layer data exist, information on a number of layers, and information required for identifying the base layer data and the enhancement layer data.

The signaling information may include frequency band information corresponding to each of the base layer data and the enhancement layer data.

In addition, the signaling information may be L2 signaling information.

According to the aforementioned various exemplary embodiments, it is possible to identify a multi-layer content in a physical layer and process only a desired content.

BRIEF DESCRIPTION OF THE DRAWINGS

The above and/or other aspects of the inventive concept will be more apparent by describing certain exemplary embodiments with reference to the accompanying drawings, in which:

FIG. 6 is a diagram illustrating a syntax of signaling data according to an exemplary embodiment;

FIG. 22 is a flowchart provided to briefly demonstrate an operation of a receiving apparatus from the moment when a user selects a service until the actually selected service is reproduced, according to an exemplary embodiment.

DETAILED DESCRIPTION OF THE EXEMPLARY EMBODIMENTS

Figure 1:
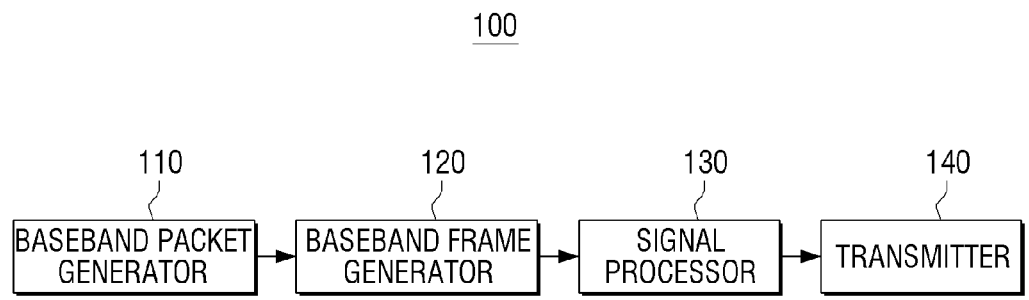
FIG. 1 is a block diagram illustrating a structure of a transmitting apparatus according to an exemplary embodiment.

Certain exemplary embodiments of the inventive concept are described in greater detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, the exemplary embodiments can be practiced without those specifically defined matters. Also, well-known functions or constructions are not described in detail since they would obscure the inventive concept with unnecessary detail.

FIG. 1 is a block diagram illustrating a structure of a transmitting apparatus according to an exemplary embodiment.

According to FIG. 1, a transmitting apparatus 100 includes a baseband packet (BBP) generator 110, a baseband frame (BBF or BBFRAME) generator 120, a signal processor 130, and a transmitter 140.

In response to input of data, the baseband packet generator 110 may generate a baseband packet for mapping the data with a physical layer. To be specific, the baseband packet includes a header and payload data. Here, the header may include information on the payload data and information on fields constituting the header.

The payload data may include one of an Internet protocol (IP) packet, a transport stream (TS) packet, and signaling information, and may include a combination thereof. The data included in the payload data is not limited to the aforementioned examples, and the payload data may include various types of data.

The baseband packet refers to a unit packet which is necessary for mapping various types of input data with a physical layer. For example, the IP packet may be transmitted as a single physical layer pipe (PLP) through the baseband packet or may be transmitted along with the signaling information according to a need.

The baseband packet according to an exemplary embodiment includes signaling information which indicates that the input data or payload data includes at least one of base layer data and enhancement layer data.

The baseband frame generator 120 may generate a frame including at least one baseband packet. To be specific, the baseband frame generator 120 may generate a baseband frame having a size corresponding to a forward error correction (FEC) code by arranging therein a plurality of baseband packets each including an IP packet and a header. Such operation may be applied to the aforementioned various types of data in a same manner, as well as the IP packet. A DVB-T2 system applies a PLP concept which enables a single broadcasting channel to provide various broadcasting services having different modulation methods, channel coding rates, times, cell interleaving lengths, etc.

In this case, the PLP refers to a signal route which is processed independently. That is, each service (for example, a video, an extended video, an audio, a data stream, etc.) may be transmitted or received through multiple radio frequency (RF) channels. The PLP is a route where the services are transmitted or is a stream which is transmitted through the route. In addition, the PLP may be located on slots which are distributed on multiple RF channels with temporal intervals, or may be distributed on a single RF channel with temporal intervals. That is, a PLP may be distributed and transmitted on a RF channel or multiple RF channels, with temporal intervals.

A PLP structure includes of Input mode A which provides a PLP and Input mode B which provides a plurality of PLPs. The PLP structure supporting Input mode B may provide a certain robust service. Further, the PLP structure may extend a time interleaving length by distributing and transmitting a stream such that an advantage of time diversity is obtained. In addition, in order to receive only a specific stream, power of a receiver may be turned off during the time of receiving different streams, thereby reducing power consumption. Thus, the receiver has portability and is appropriate to provide a mobile broadcasting service.

Here, the time diversity refers to a skill which, in response to a same signal being transmitted several times at certain time intervals from a transmitter in order to decrease deterioration of transmission quality in a mobile communication transmission route, enables a receiver to synthesize the signals and obtain satisfactory transmission quality.

Meanwhile, it is possible to increase transmission efficiency by including information which may be commonly transmitted to a plurality of PLPs in a PLP and transmitting the information. Such operation may be performed by PLP0. The PLP0 may be called a common PLP. The other PLPs than the PLP0 may be used for data transmission and may be called a data PLP.

By using such common PLP and data PLP, it is possible to provide a HDTV program to fixed receivers in a domestic environment and also provide a standard-definition TV (SDTV) program to a mobile receiver on the move. In addition, it is possible to provide a viewer with various broadcasting services through a broadcasting station or a broadcasting content provider, and provide a differentiated service which enables a viewer to receive a broadcasting service even in a fringe area where reception is poor.

The baseband frame generator 120 may generate a plurality of baseband frames each including a baseband packet which maps the input data with at least one signal processing route, that is, PLP, respectively. The signal processor 130 may signal process the plurality of generated baseband frames. To be specific, the signal processor 130 may perform a signal processing operation for respective routes. For example, a signal processing operation may include at least one of processing operations such as input stream synchronization, delay compensation, null packet deletion, cyclical redundancy check (CRC) encoding, header insertion, coding, interleaving, and modulation. The baseband frames to which the signal processing operation for respective route is applied are generated as a single transmission frame along with the signaling information, and the generated transmission frame is transmitted to a receiver (not shown.)

In addition, the transmitter 140 may transmit the plurality of signal processed baseband frames.

Figure 2:
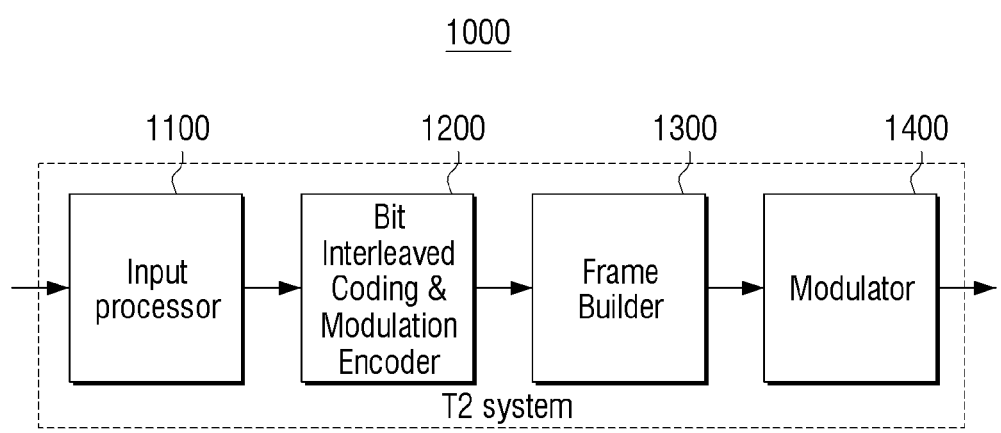
FIG. 2 is a block diagram provided to describe a structure of a DVB-T2 system.

FIG. 2 is a block diagram provided to describe a structure of a DVB-T2 system which is a basis of the exemplary embodiments.

According to FIG. 2, a DVB-T2 transmission system 1000 may include an input processor 1100, a bit interleaver coding and modulation (BICM) encoder 1200, a frame builder 1300, and a modulator 1400.

A definition of the DVB-T2 transmission system 1000 is the same as a definition in the DVB-T2 which is one of the European digital broadcasting standards. Thus, each component of the DVB-T2 transmission system 1000 is described concisely. For details of the DVB-T2 system 1000, "Digital Video Broadcasting (DVB); Frame structure channel coding and modulation for a second generation digital terrestrial television broadcasting system (DVB-T2)" may be referred.

The input processor 1100 generates a baseband frame from an input stream with respect to data to be serviced. In this case, the input stream may be a Moving Picture Experts Group (MPEG)-2 TS, a generic stream (GS), etc.

The BICM encoder 1200 determines an FEC coding rate and a constellation order according to an area (a fixed PHY frame or a mobile PHY frame) to which the data to be serviced will be transmitted and performs an encoding operation. Signaling information regarding the data to be serviced may be encoded through another BICM encoder (not shown) or may be encoded by sharing the BICM encoder 1200 with the data to be serviced, according to an exemplary embodiment.

The frame builder 1300 and the modulator 1400 constitute a frame by determining an OFDM parameter for a signaling area and an OFDM parameter with respect to an area to which the data to be serviced will be transmitted, and generate a frame by adding a sync signal. In addition, the frame builder 1300 and the modulator 1400 perform a modulation operation for modulating the generated frame into an RF signal and transmit the RF signal to the receiver.

In this case, the modulator 1400 includes a multiple input single output (MISO) processor (not shown), a pilot inserter (not shown), an inverse fast Fourier transform (IFFT) unit (not shown), a peak-to-average power ratio (PAPR) reduction unit (not shown), a guard interval inserter (not shown), a P1 symbol inserter (not shown), and a digital-to-analog (DA) converter (not shown).

Meanwhile, according to an exemplary embodiment, the baseband packet generator 110 and the baseband frame generator 120 may correspond to the input processor 1100 of the DVB-T2 transmission system 1000. An operation of generating a baseband packet and a baseband frame is described in detail with reference to FIGS. 3 and 4.

Figure 3:
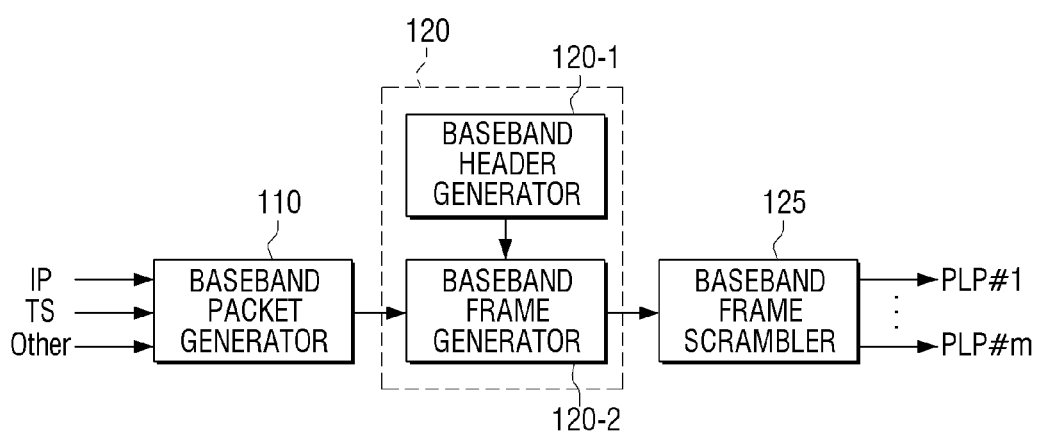
FIG. 3 is a block diagram illustrating a detailed configuration of a baseband frame generator according to an exemplary embodiment.

FIG. 3 is a block diagram illustrating a detailed configuration of a baseband frame generator according to an exemplary embodiment.

Referring to FIG. 3, the baseband frame generator 120 may further include a baseband header generator 120-1. Herein, the baseband header generator 120-1 is illustrated separately in order to distinguish from the baseband frame generator 120.

The baseband frame generator 120 may transmit the generated baseband frame to a baseband frame scrambler 125.

The baseband packet generator 110 may generate a baseband packet to be transmitted to each PLP in connection with an input mode, from an inputted IP packet, a TS packet, and various types of data. In this case, the baseband packet corresponds to an L2 packet in an International Organization for Standardization (ISO) 7 layer model. That is, the baseband packet generator 110 may generate a baseband packet by encapsulating the packets (IP packet, TS packet, etc.) input from an upper layer above Layer 2.

In addition, in response to the input data having data of various layers, the baseband packet generator 110 may encapsulate the data of various layers and generate a baseband packet. In this case, the baseband packet may further include signaling information which indicates that data of various layers are included.

For example, in case that a baseband packet includes at least one of the base layer data and the enhancement layer data, the baseband packet may include the signaling information which indicates that the packet includes at least one of the base layer data and the enhancement layer data. In addition, the baseband packet may include only the signaling information or may include an indicator field indicating the signaling information.

The baseband header generator 120-1 may generate a header which is inserted in a baseband frame. In this case, a header which is inserted in a baseband frame is called a baseband header, and the baseband header includes information on the baseband frame.

The baseband frame generator 120-2 may generate a baseband frame by encapsulating the baseband header generated from the baseband header generator 120-1 with the baseband packet outputted from the baseband packet generator 110.

In addition, the baseband frame scrambler 125 may generate a scrambled baseband frame by randomly mixing data stored in the baseband frame before an FEC code is added to each baseband frame. The scrambled baseband frame is transmitted through a PLP and signal processed.

Figure 4:
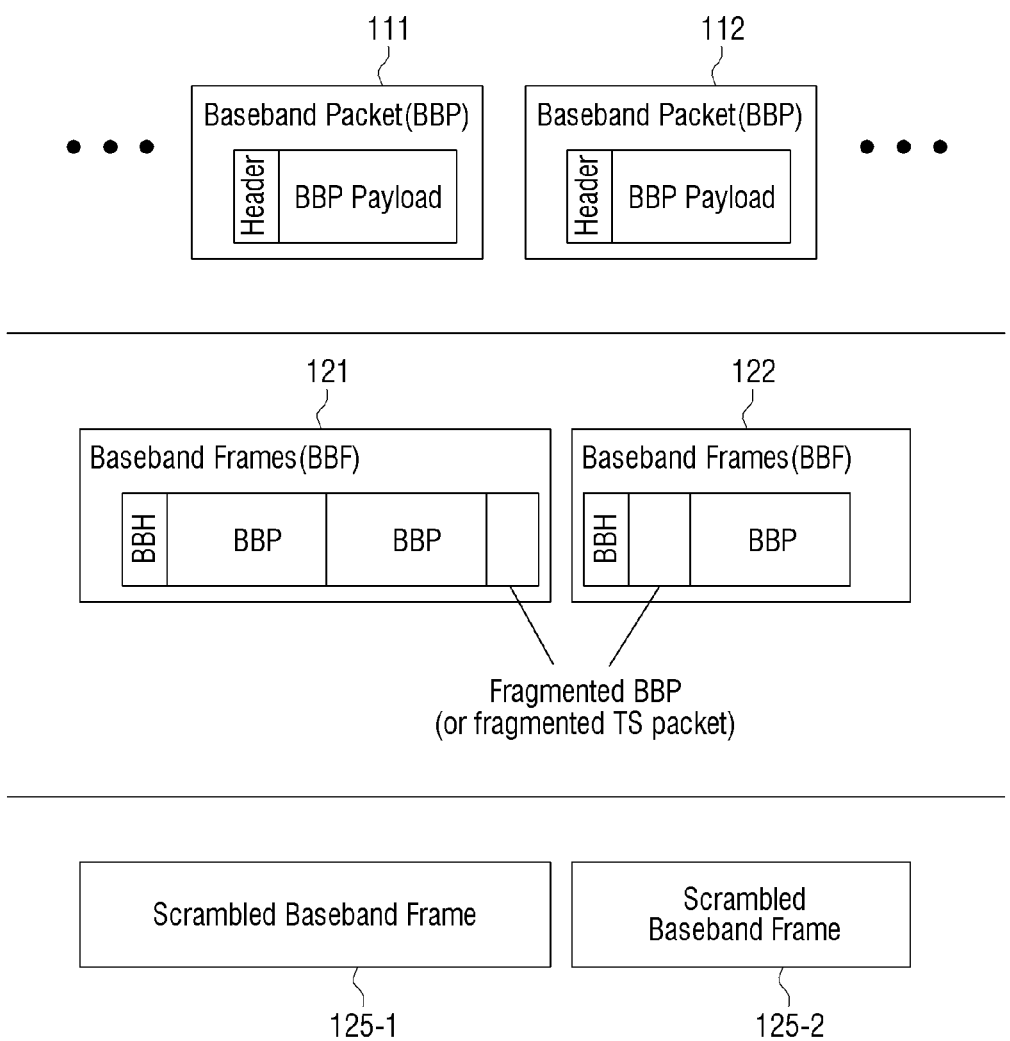
FIG. 4 is a diagram illustrating a baseband packet, a baseband frame, and a scrambled baseband frame according to an exemplary embodiment.

FIG. 4 is a diagram illustrating a baseband packet, a baseband frame, and a scrambled baseband frame according to an exemplary embodiment.

Referring to FIG. 4, the baseband packet generator 110 may generate a plurality of baseband packets 111 and 112 by storing various types of data, such as the IP packet, the TS packet, etc., in a baseband packet payload and insert a header, and the baseband frame generator 120 may generate a plurality of baseband frames 121 and 122 by grouping the plurality of generated baseband packets 111 and 112 and inserting a baseband header. Each of the baseband frames 121 and 122 may include a plurality of baseband packets or may include a fragmented baseband packet.

As shown in FIG. 4, when a fragmented baseband packet is inserted in the first baseband frame 121, the remaining portion of the baseband packet is inserted in the second baseband frame 122.

The baseband frame scrambler 125 may generate a plurality of scrambled baseband frames 125-1 and 125-2 by randomly scrambling each of the generated baseband frames 121 and 122. The generated scrambled baseband frames 125-1 and 125-2 are transmitted to a PLP as described above, and a signal processing operation for adding an FEC code may be performed.

Meanwhile, the baseband packets 111 and 112 may include at least one of the base layer data and the enhancement layer data. In addition, the baseband packets 111 and 112 may include the signaling information which indicates that the baseband packets 111 and 112 include at least one of the base layer data and the enhancement layer data.

The base layer data and the enhancement layer data constitute different PLPs. For example, the base layer data may constitute a PLP_B, and the enhancement layer data may constitute a PLP_E.

In addition, the signaling information may indicate that the base layer data is transmitted by constituting the PLP_B, the enhancement layer data is transmitted by constituting the PLP_E, and the base layer data and the enhancement layer data constitute a single multi-layer content.

Additionally, the signaling information may indicate information on a physical frame to which the PLP_B constituted by the base layer data is transmitted and information on a physical frame to which the PLP_E constituted by the enhancement layer data is transmitted.

The signaling information may include information which indicates whether each of a plurality of baseband frames including at least one of the base layer data and the enhancement layer data is a frame for supporting a mobile device or a frame for supporting a fixed device. That is, the signaling information may be information which indicates whether the physical frame to which the PLP_B or the PLP_E is transmitted is a mobile frame (a frame for supporting a mobile device) or a fixed frame (a frame for supporting a fixed device).

Figure 5:
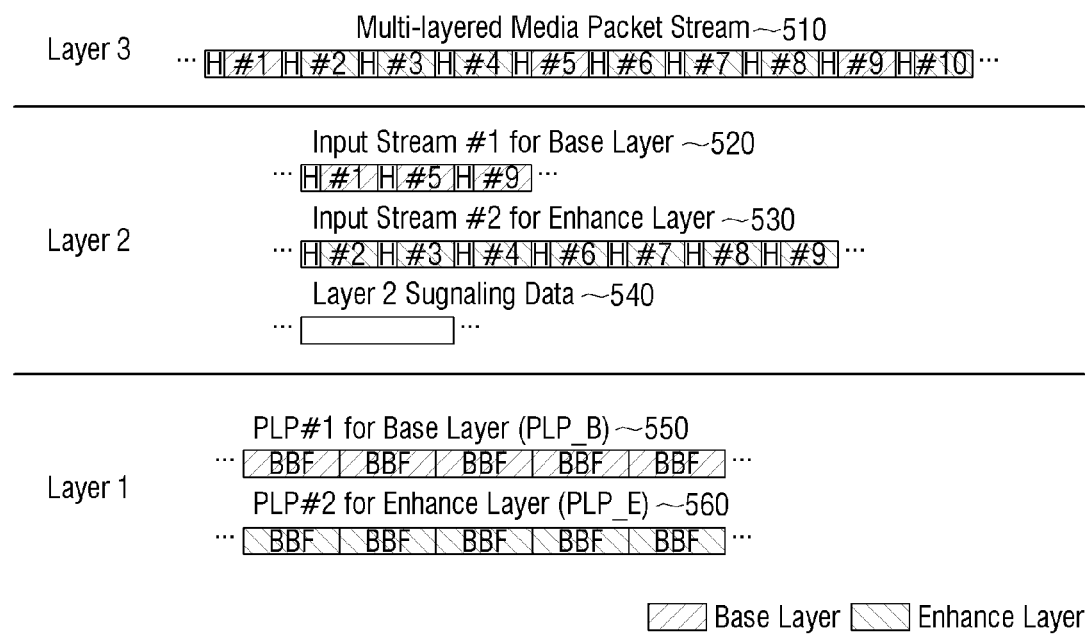
FIG. 5 is a diagram illustrating a configuration of data of each layer according to an exemplary embodiment.

FIG. 5 is a diagram illustrating a configuration of data of each layer according to an exemplary embodiment.

A multi-layered media packet stream 510 in Layer 3, which is an upper layer, includes base layer data, enhancement layer data, and a header.

The multi-layered media packet stream 510 may be divided into the base layer data and the enhancement layer data in Layer 2, and may be formed as input stream #1 520 for the base layer data and input stream #2 530 for the enhancement layer data. In addition, signaling data 540 for signaling information may be generated. In this case, as described above, the signaling information is information which indicates that the input data includes the base layer data and the enhancement layer data.

In Layer 1, a PLP_B 550 for the base layer data and a PLP_E 560 for the enhancement layer data may be generated. In addition, the PLP_B and the PLP_E in Layer 1 are formed of baseband frames.

Meanwhile, although not shown in FIG. 5, the signaling data 540 in Layer 2 may be included and transmitted in the PLP_B 550 for the base layer data or the PLP_E 560 for the enhancement layer data. Alternatively, the signaling data 540 may be formed and transmitted as input stream #3 (not shown) or a PLP_S (not shown).

FIG. 6 is a diagram illustrating syntax of signaling information according to an exemplary embodiment.

The signaling information may include at least one of Multi_Layered Media Identifier (ID) indicating whether the base layer data and the enhancement layer data exist, Number of Layered Media indicating the number of layers, and Multi_Layered Media Information indicating information for identifying the base layer data and the enhancement layer data.

Referring to FIG. 6, the Multi_Layered Media ID may indicate whether a content is a multilayered content, and the Number of Layered Media may indicate the number of layers. For example, if a base layer and an enhancement layer exist, a value of the Number of Layered Media may be 2.

The Multi_Layered Media Information indicates information for identifying each of the base layer data and the enhancement layer data. For example, in case of i being 0, the Multi_Layered Media Information indicates the base layer data, in case of i being 1, indicates a first enhancement layer data, and in case of i being 2, indicates a second enhancement layer data.

Meanwhile, PLP_ID in the syntax of the signaling information in FIG. 6 indicates a PLP_ID which transmits data regarding a corresponding layer, and a Frame ID indicates a physical frame ID which transmits data regarding the corresponding layer. For example, the Frame ID indicates whether the data regarding the layer is transmitted to a mobile frame or transmitted to a fixed frame.

RF Frequency in the syntax of the signaling information in FIG. 6 indicates an RF frequency where the data regarding the layer is transmitted, which is to support that the base layer data and the enhancement layer data are transmitted through different RF frequency bands. To be specific, the signaling information may include information on a frequency band corresponding to each of the base layer data and the enhancement layer data. The related description will be given below.

Meanwhile, as described above, the signaling information which indicates that the data includes at least one of the base layer data and the enhancement layer data may be referred to as L2 signaling information.

The transmitting apparatus 100 may further include an information inserter (not shown) which inserts L1 signaling information in a signaling area of each of the plurality of generated baseband frames. In this case, the L1 signaling information may include information on a location where the base layer data and the enhancement layer data are inserted in the plurality of baseband frames and parameter information on each of the base layer data and the enhancement layer data. The parameter information may include at least one of an OFDM FFT size, a guard interval, a constellation order, and an FEC code rate.

The L1 signaling information includes the parameter information on each of the PLP_B for the base layer data and the PLP_E for the enhancement layer data, and information on an insertion location within a physical frame. Such L1 signaling information is distinguished from the aforementioned signaling information (L2 signaling information). Hereinafter, an operation of generating the L1 signaling information is described in detail with reference to FIGS. 7 to 11.

Figure 7:
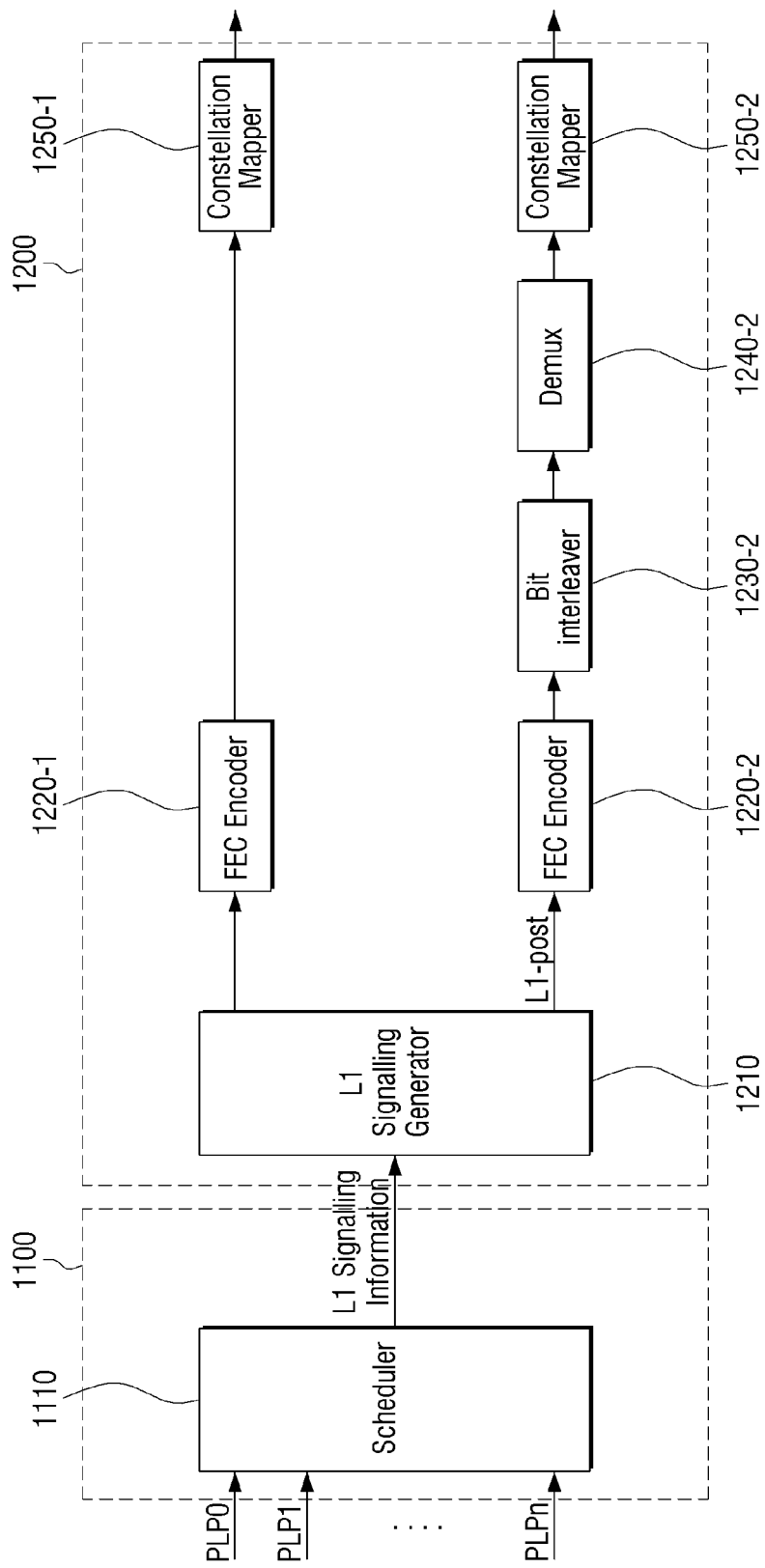
FIG. 7 is a block diagram provided to describe an operation of generating L1 signaling information according to an exemplary embodiment.

FIG. 7 is a block diagram provided to describe an operation of generating L1 signaling information according to an exemplary embodiment.

FIG. 7 illustrates a structure of the input processor 1100 and the BICM encoder 1200 shown in FIG. 2. The input processor 1100 may include a scheduler 1110. The BICM encoder 1200 may include an L1 signaling generator 1210, an FEC encoder 1220-1 and 1220-2, a bit interleaver 1230-2, a demultiplexer 1240-2, and a constellation mapper 1250-1 and 1250-2. The BICM encoder 1200 may further include a time interleaver (not shown). In addition, the L1 signaling generator 1210 may be included in the input processor 1100.

N pieces of service data are mapped with PLP0 to PLPn, respectively. The scheduler 1110 determines a location, a modulation rate, and a code rate for each PLP in order to map several PLPs with a physical layer. That is, the scheduler 1110 generates an L1 signaling formed of an L1-pre signaling and an L1-post signaling. The scheduler 1110 may output dynamic information among the L1-post signaling of a current frame to the frame builder 1300. In addition, the scheduler 1110 may transmit the L1 signaling to the BICM encoder 1200.

The L1 signaling generator 1210 distinguishes and outputs the L1-pre signaling and the L1-post signaling. The FEC encoders 1220-1 and 1220-2 perform an FEC encoding operation including shortening and puncturing with respect to the L1-pre signaling and the L1-post signaling, respectively. The bit interleaver 1230-2 performs an interleaving operation with respect to the encoded L1-post signaling in a unit of a bit. The demultiplexer 1240-2 controls robustness of a bit by changing an order of bits constituting a cell and outputs a cell including the bits. Two constellation mappers 1250-1 and 1250-2 map cells of the L1-pre signaling and cells of the L1-post signaling with constellation, respectively. The L1-pre signaling and the L1-post signaling processed through the aforementioned operations are output to the frame builder 1300. Accordingly, the L1-pre signaling and the L1-post signaling may be inserted in a frame.

Figure 8:
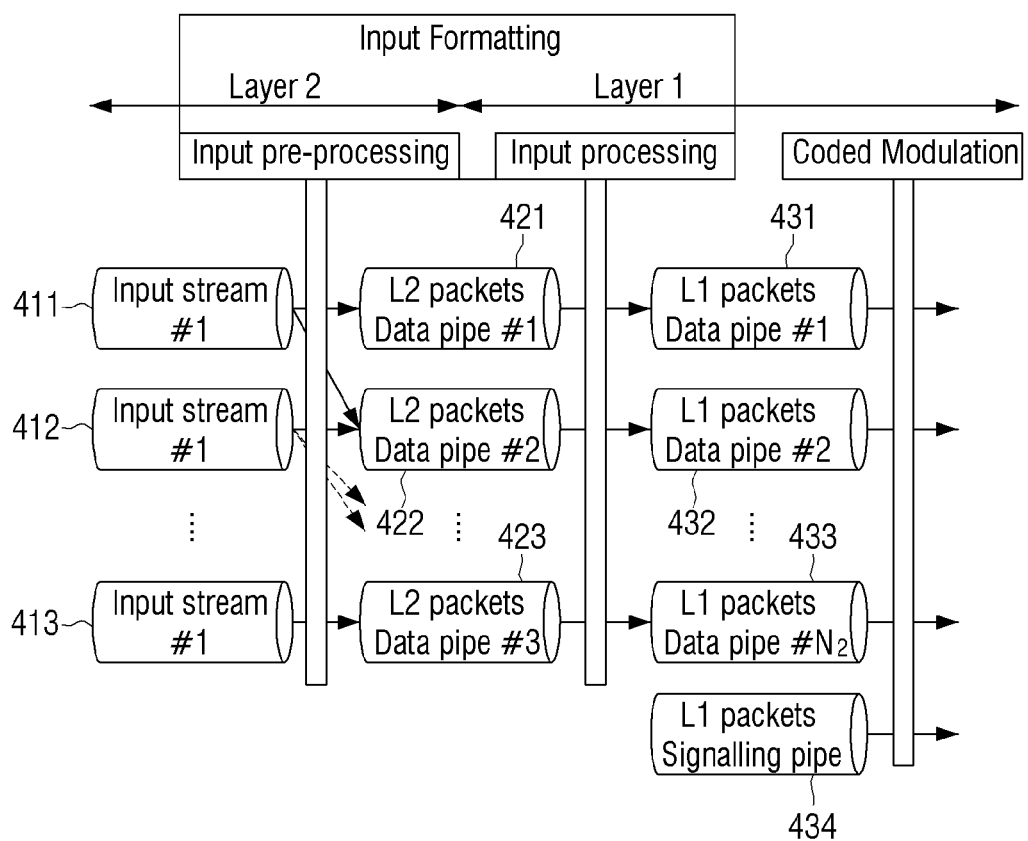
FIG. 8 is a diagram provided to describe an input processing module which operates in a data pipe level and an operation of processing an input stream as an L1 packet (baseband frame) according to an exemplary embodiment.
Figure 9:
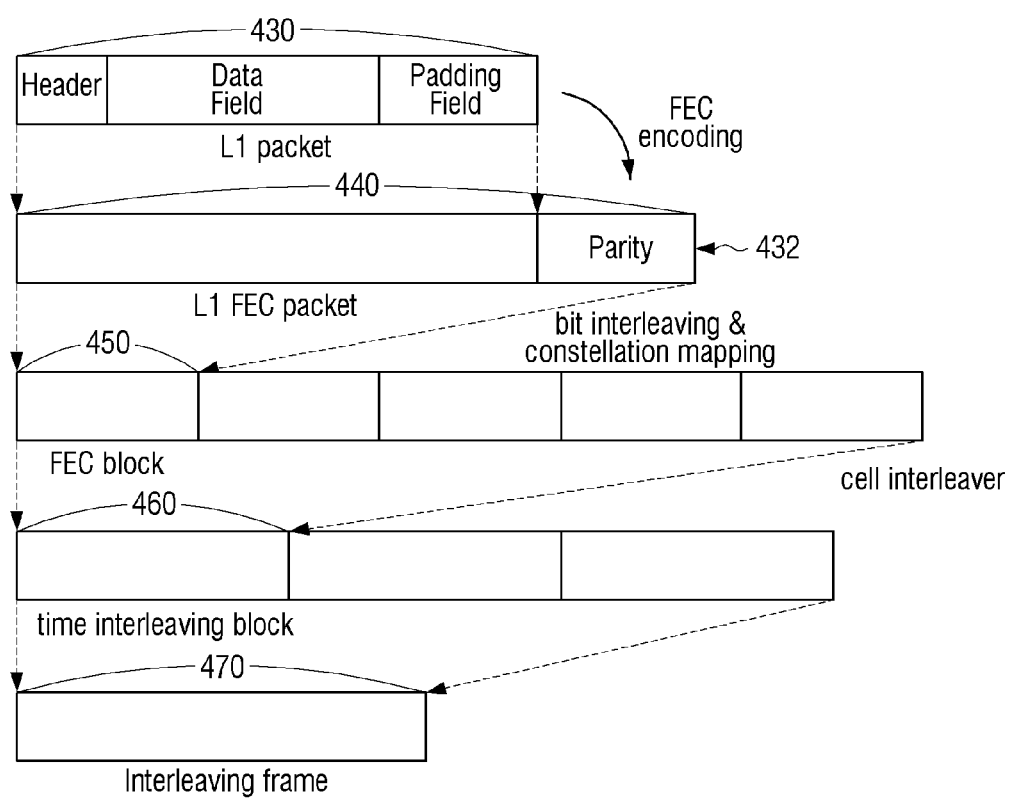
FIG. 9 is a diagram provided to describe a local frame structure of each physical layer pipe (PLP) according to an exemplary embodiment.
Figure 10:
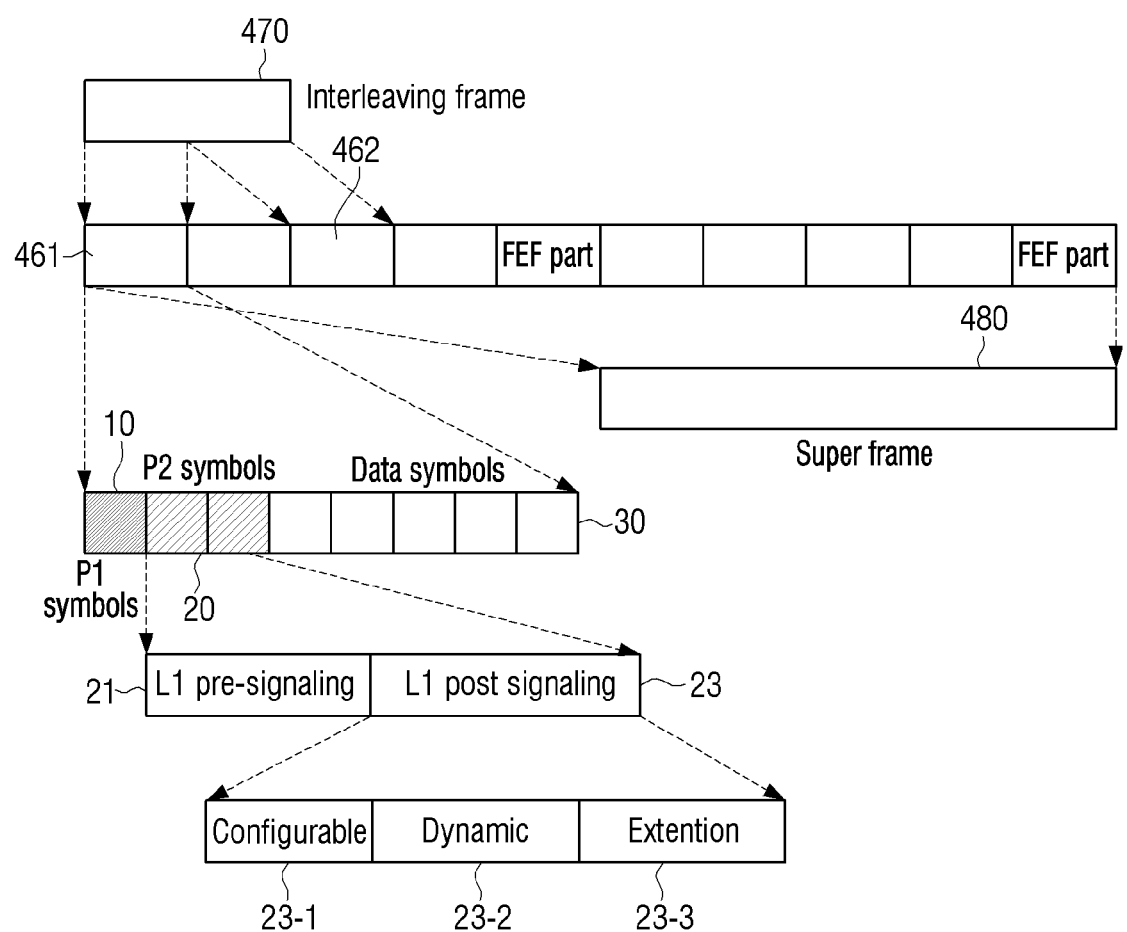
FIG. 10 is a diagram provided to describe a structure of an interleaving frame according to an exemplary embodiment.

FIGS. 8 to 10 are diagrams provided to describe a unit structure of a transmission frame according to an exemplary embodiment.

As shown in FIG. 8, an input processing module where an input stream is processed as a L1 packet (baseband frame) may operate in a data pipe level.

FIG. 8 illustrates a process where an input stream is processed as an L1 packet equivalent to a baseband frame. In FIG. 8, a plurality of input streams 411 to 413 are processed as data pipes 421 to 423 with respect to a plurality of L2 packets equivalent to baseband packets through an input pre-processing operation. In addition, the data pipes 421 to 423 with respect to the plurality of L2 packets are encapsulated into data pipes 431 to 433 with respect to a plurality of L1 packets through an input processing operation and scheduled as a transmission frame. In this case, the L2 packet may include two types of stream, that is, a fixed stream such as a TS stream and a variable stream such as a general stream encapsulation (GSE) stream.

FIG. 9 is a diagram provided to describe a local frame structure of each PLP.

As shown in FIG. 9, an L1 packet 430 includes a header, a data field, and a padding field.

A parity 432 is added to the L1 packet 430 through an FEC encoding operation, and the L1 packet 430 is processed as an L1 FEC packet 440.

The L1 FEC packet 440 is processed as an FEC block 450 through a bit interleaving operation and a constellation mapping operation. A plurality of FEC blocks are processed as a time interleaving block 460 through a cell interleaving operation. In addition, a plurality of time interleaving blocks constitute an interleaving frame 470.

FIG. 10 is a diagram provided to describe a structure of an interleaving frame.

Referring to FIG. 10, the interleaving frame 470 may be transmitted through different transmission frames 461 and 462, and a plurality of transmission frames may form a single superframe 480. A transmission frame generated in this manner may be referred to as a T2 frame.

Meanwhile, the transmission frame 461 may include a P1 symbol 10 providing information on a start position of a frame, a P2 symbol 20 transmitting an L1 signaling, and a data symbol 30 transmitting data.

The P1 symbol 10 is located at a beginning position of the transmission frame 461 and may be used to detect a start point of a T2 frame. For example, the P1 symbol 10 may transmit seven-bit information.

The P2 symbol 20 is located next to the P1 symbol 10 of the T2 frame. The single transmission frame 461 may include a plurality of P2 symbols 20 according to an FFT size. The number of P2 symbols 20 which are included according to the FFT size is as follows:

TABLE 1

| FFT size | The number of FFT symbols |
|---|---|
| 1K | 16 |
| 2K | 8 |
| 4K | 4 |
| 8K | 2 |
| 16K | 1 |
| 32K | 1 |

The P2 symbol 20 includes an L1-pre signaling 21 and an L1-post signaling 23. The L1-pre signaling 21 provides a basic transmission parameter including parameters required to receive and decode the L1-post signaling.

The L1-post signaling 23 includes a configurable post signaling 23-1 and a dynamic post signaling 23-2. In addition, the L1-post signaling 23 may include an extension field 23-3 selectively. In addition, although not shown in FIG. 10, the L1-post signaling 23 may further include a cyclic redundancy check (CRC) field and, may further include an L1 padding field.

As described above, the transmitter 140 transmits a signal-processed baseband frame which includes the L1 signaling information. In particular, in case of a multi-layer content for supporting both of a mobile device and a fixed device, the transmitter 140 transmits the base layer data to a mobile frame which is formed of parameters determined to support a mobile device and transmit the enhancement layer data to a fixed frame which is formed of parameters determined to support a fixed device. In this case, the mobile frame is relatively robust to a poor channel environment, as compared with a fixed frame.

For example, a mobile frame may include an FFT size 8K of OFDM, a guard interval 1/8, a constellation order 16 QAM, a low density parity check (LDPC) code rate 1/2, etc., and a fixed frame may include an OFDM FFT size 32K, a guard interval 1/32, a constellation order 256 QAM, an LDPC code rate 2/3, etc.

Figure 11:
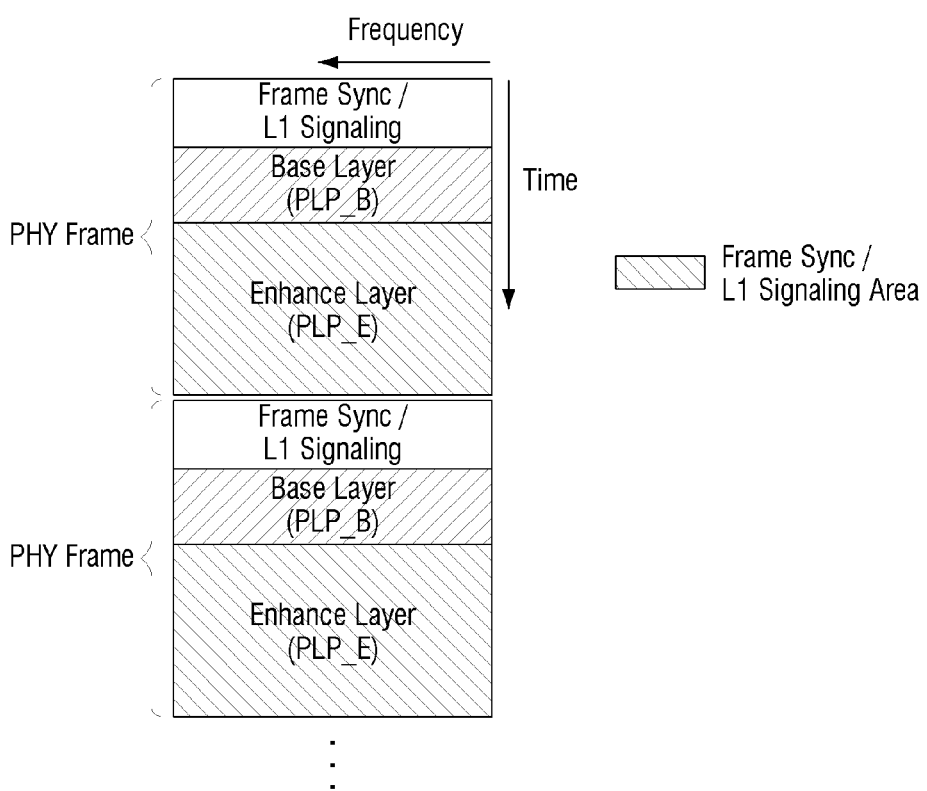
FIGS. 11 to 13 are diagrams provided to describe a structure of a transmission frame according to exemplary embodiments.
Figure 12:
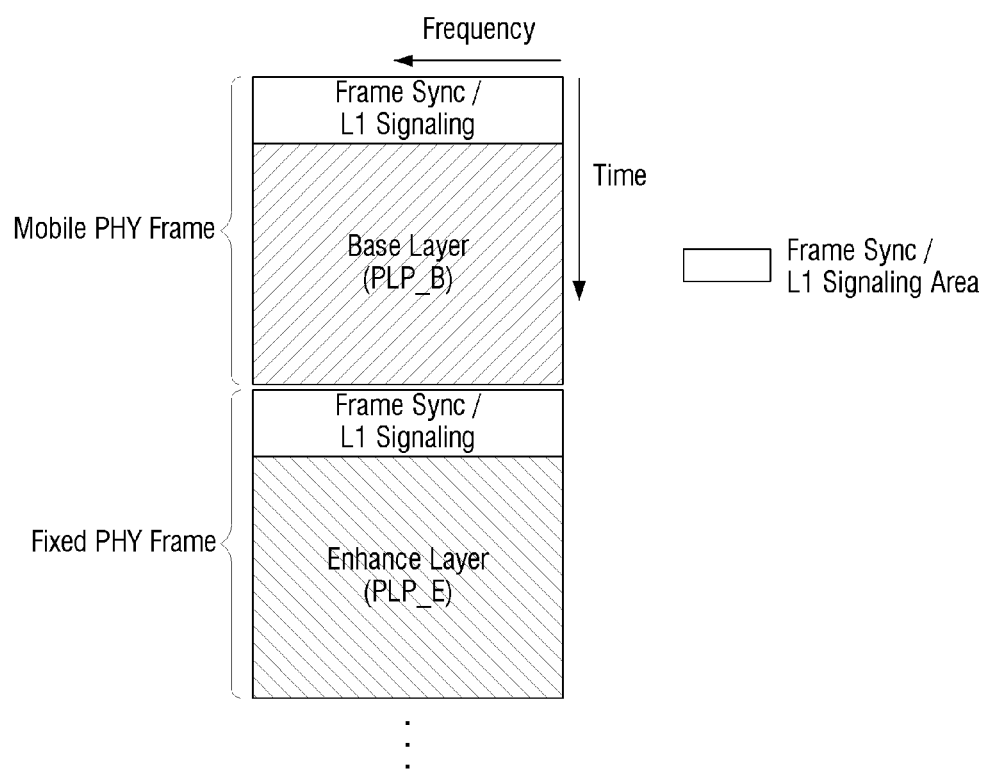
Figure 13:
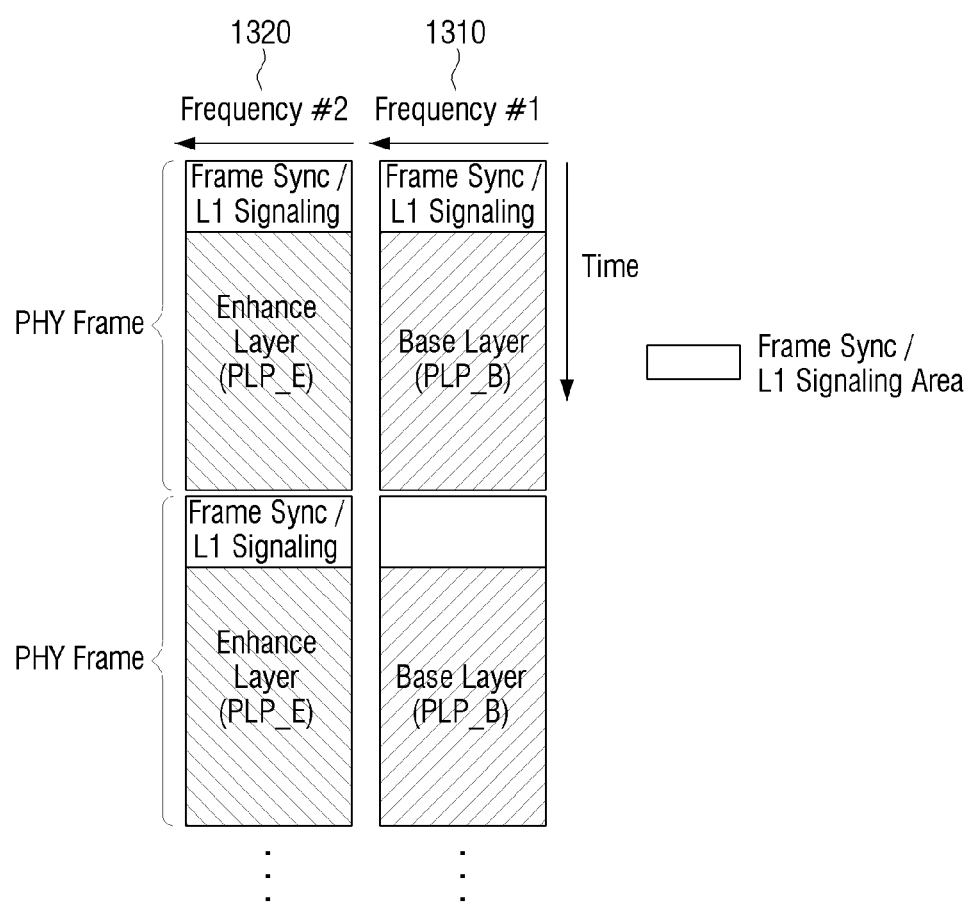

FIGS. 11 to 13 are diagrams provided to describe a structure of a transmission frame according to an exemplary embodiment.

The transmission frame illustrated in FIGS. 11 to 13 refers to a signal-processed baseband frame, and may correspond to a T2 frame of the DVB-T2.

Referring to FIG. 11, the transmission frame may be transmitted with separately including the PLP_B for the base layer data and the PLP_E for the enhancement layer data in a physical frame having the same parameters.

In this case, a frame sync/L1 signaling area includes information on a location of the PLP_B and the PLP_E in the physical frame and may include information on an OFDM FFT size, a guard interval, a constellation order, a length of FEC, and an FEC code rate. In addition, the frame sync/L1 signaling area may further include information on a group ID for indicating that the PLP_B and the PLP_E are engaged with each other.

Referring to FIG. 12, unlike in FIG. 11, the PLP_B for the base layer data may be included and transmitted in a mobile physical frame, and the PLP_E for the enhancement layer data may be included and transmitted in a fixed physical frame.

Accordingly, in case of playing back only the base layer data, the receiving apparatus (not shown) may access to only a mobile physical frame and decode only the base layer data. In addition, in case of playing back only the enhancement layer data, the receiving apparatus (not shown) may access to only a fixed physical frame and decode only the enhancement layer data.

For example, an HD content may be supported by the base layer data, and a ultra high-definition (UHD) content may be supported by adding the enhancement layer data to the base layer data.

In this case, the transmitting apparatus 100 may include and transmit the base layer data supporting the HD content in the mobile physical frame so that the mobile terminal device and the fixed terminal device access to the mobile physical frame and play back the HD content.

In addition, the transmitting apparatus 100 may include and transmit the base layer data supporting the HD content in the mobile physical frame and may include and transmit the enhancement layer data for additionally supporting the UHD content in the fixed physical frame so that the fixed terminal device plays back the UHD content by combining the previously received base layer data with the additionally received enhancement layer data.

In addition, the aforementioned L2 signaling information may provide information regarding whether each of the baseband frames including the base layer data or the enhancement layer data is a frame for supporting a mobile device or a frame for supporting a fixed device. In addition, the L1 signaling information may provide information regarding whether the frame, i.e., transmission frame, is a mobile frame for supporting the mobile device or a fixed frame for supporting the fixed device. Accordingly, the receiving apparatus (not shown) may determine whether the base layer data and the enhancement layer data are included based on the L2 signaling information and the L1 signaling information, and access to a desirable frame in order to process desirable data.

Referring to FIG. 13, FIG. 13 shows an example where the base layer data and the enhancement layer data are transmitted through different frequency bands. That is, the base layer data is transmitted by being included in a physical frame in a frequency band indicated by a frequency #1 1310, and the enhancement layer data is transmitted by being included in a physical frame in a frequency band indicated by a frequency #2 1320.

As in FIG. 12, such operation may be applied under an environment where the base layer data supporting the HD content is transmitted by being included in the mobile physical frame, and the enhancement layer data for additionally supporting the UHD content is transmitted by being included in the fixed physical frame but the frequency band supporting the mobile physical frame is different from the frequency band supporting the fixed physical frame.

In particular, the L2 signaling information may include information on a frequency band corresponding to each of the base layer data and the enhancement layer data. In addition, the L1 signaling information may include information which indicates that a band indicated by the frequency #1 1310 and a band indicated by the frequency band #2 1320 are bundled with each other. In addition, the L1 signaling information may include information which indicates that the PLP_B for the base layer data and the PLP_E for the enhancement layer data are grouped under the same group_ID.

To be specific, the L1 signaling information of a frame which transmit the base layer data in the frequency #1 1310 may further include frequency band information on the bundled frequency #2 1320 and information which indicates that a PLP_ID for the enhancement layer data related to the PLP_B for the base layer data is the PLP_E.

Figure 14:
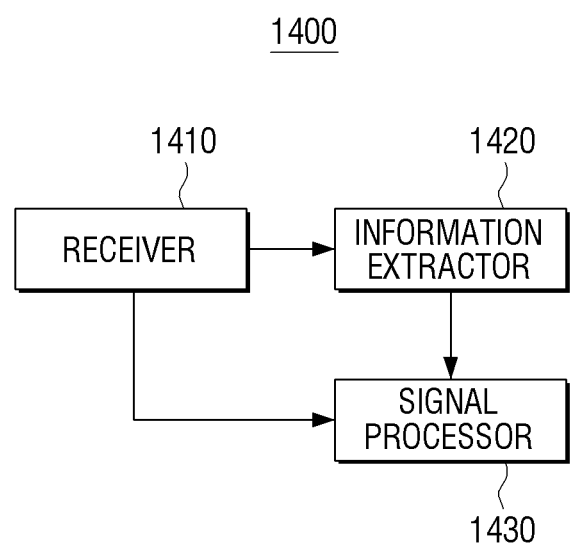
FIG. 14 is a block diagram illustrating a structure of a receiving apparatus according to an exemplary embodiment.

FIG. 14 is a block diagram illustrating a structure of a receiving apparatus according to an exemplary embodiment.

Referring to FIG. 14, a receiving apparatus 1400 includes a receiver 1410, an information extractor 1420, and a signal processor 1430.

The receiver 1410 receives a plurality of baseband frames each including at least one baseband packet.

The information extractor 1420 may extract a baseband packet from a received baseband frame. To be specific, extracting a baseband packet represents extracting the L2 signaling information included in the baseband packet.

In this case, the L2 signaling information may include information which indicates whether the baseband frame, in which the baseband packet is included, includes at least one of the base layer data and the enhancement layer data, and whether the baseband frame including at least one of the base layer data and the enhancement layer data is a frame for supporting a mobile device or a frame for supporting a fixed device. In addition, the L2 signaling information may include information on a frequency band corresponding to each of the base layer data and the enhancement layer data.

The signal processor 1430 signal processes the baseband frame based on the signaling information included in the extracted baseband packet.

As described above, the signaling information included in the extracted baseband packet is the L2 signaling information. In addition, the signal processor 1430 may signal-process the baseband frames based on the L2 signaling information.

To be specific, the signal processor 1430 may determine whether the baseband frame includes the base layer data and the enhancement layer data based on the signaling information. In this case, the signaling information refers to the L2 signaling information.

The signal processor 1430 may signal-process each of the base layer data and the enhancement layer data based on the L1 signaling information included in a signaling area of a baseband frame. In this case, the L1 signaling information includes information on a location where the base layer data and the enhancement layer data are inserted in the baseband frame and parameter information on each of the base layer data and the enhancement layer data.

In addition, the signal processor 1430 may selectively process only a frame including desirable data based on the L1 signaling information and the L2 signaling information. For example, a frame processing operation may include demodulation, frame de-building, BICM decoding, and input de-processing operations.

Figure 15:
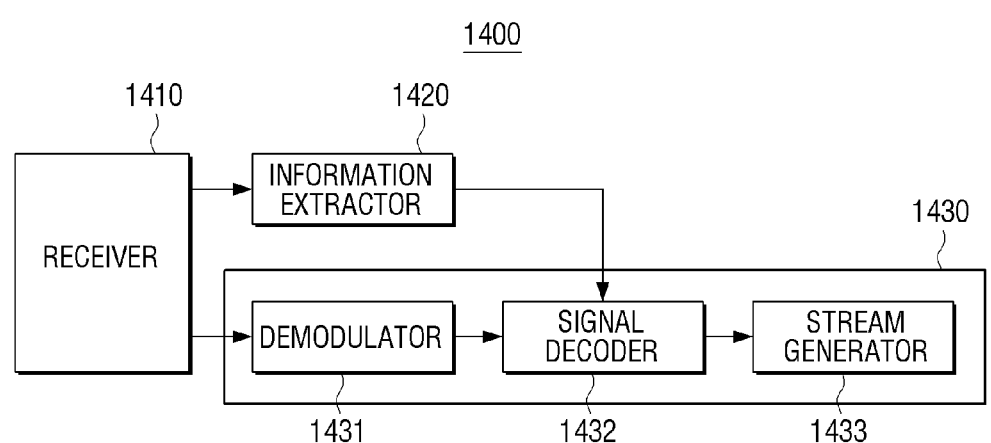
FIG. 15 is a block diagram provided to specifically describe a signal processor according to an exemplary embodiment.

FIG. 15 is a block diagram provided to specifically describe a signal processor according to an exemplary embodiment.

Referring to FIG. 15, the signal processor 1430 includes a demodulator 1431, a signal decoder 1432, and a stream generator 1433.

The demodulator 1431 performs a sync detection operation by performing demodulation on a received RF signal according to an OFDM parameter, and in response to a sync being detected, recognizes whether a mobile frame is received or a fixed frame is received from information stored in a sync area.

If an OFDM parameter with respect to a signaling area and a data area is not predetermined, the demodulator 1431 may perform a demodulation operation by obtaining OFDM parameter information on a signaling area and a data area stored in the sync area.

The signal decoder 1432 performs a decoding operation with respect to input data. In this case, the signal decoder 1432 may perform the decoding operation by obtaining parameters, such as an FEC method, a modulation method, etc., with respect to the data stored in a data area, by using the signaling information. In addition, the signal decoder 1432 may calculate a start position of the data based on data information included in a configurable post signaling and a dynamic post signaling of an L1-post signaling. That is, the signal decoder 1432 may calculate a position of a frame from which a corresponding PLP is transmitted.

The stream generator 1433 may generate data to be serviced by processing a baseband frame, i.e., an L1 packet, received from the signal decoder 1432.

The stream generator 1433 may generates a baseband packet, i.e., an L2 packet, from an error-corrected L1 packet based on location information provided by the information extractor 1420.

To be specific, the stream generator 1433 may include digital buffers, and the digital buffers may re-generate an accurate timing for reconstructing an output stream based on a value related to the location information on a frame provided from the information extractor 1420. Accordingly, a delay for synchronization of a plurality of PLPs may be compensated.

Meanwhile, the signaling information includes an L1-pre signaling and an L1-post signaling. The L1-post signaling includes a configurable post signaling and a dynamic post signaling.

The L1 signaling information and the L2 signaling information according to an exemplary embodiment may correspond to the aforementioned signaling information, and the baseband packet and the baseband frame may correspond to an L2 packet and an L1 packet, respectively.

Figure 16:
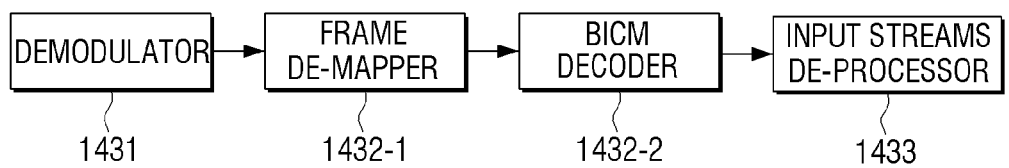
FIG. 16 is a diagram provided to specifically describe a signal processing operation according to an exemplary embodiment.

FIG. 16 is a diagram provided to specifically describe a signal processing operation according to an exemplary embodiment.

Referring to FIG. 16, the signal decoder 1432 in FIG. 15 may be embodied as a frame de-mapper 1432-1 and a BICM decoder 1432-2.

The demodulator 1431 of the receiving apparatus 1400 may perform sync detection by performing demodulation from a received RF signal according to OFDM parameter information included in the frame sync/L1 signaling area. After the sync detection, the demodulator 1431 of the receiving apparatus 1400 may recognize whether a mobile frame is received or a fixed frame is received from the L1 signaling information stored in the frame sync/L1 signaling area.

The frame de-mapper 1432-1 may perform a BICM decoding operation with respect to data stored in a data area, based on specific information (for example, parameter information, such as an FEC method, a modulation method, etc. on each service data, included in the L1 signaling information).

In addition, the frame de-mapper 1423-1 may extract the L2 signaling information and may obtain information regarding a multi-layered content from the extracted L2 signaling information. To be specific, the frame de-mapper 1423-1 may obtain information on a physical frame which reproduces the base layer data, and obtain information on a physical frame which reproduces the enhancement layer data. In addition, the frame de-mapper 1423-1 may obtain information on a frequency band to which a frame including the base layer data and the enhancement layer data is transmitted.

Accordingly, the receiving apparatus 1400 may determine a frequency band to reproduce a PLP, a PLP to be reproduced, and a frame thereof.

Meanwhile, in order to specifically describe an operation of processing the L1 signaling information and the L2 signaling information, an operation of processing signaling information is described in detail.

Figure 17:
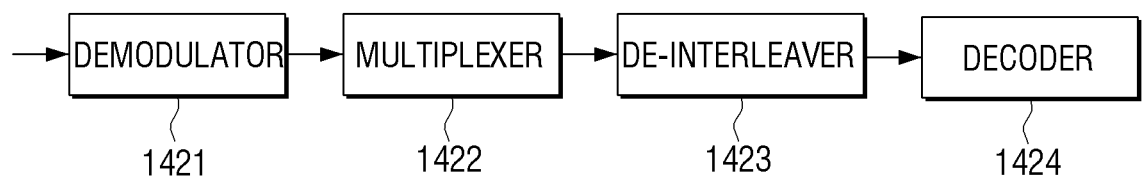
FIG. 17 is a block diagram illustrating a structure of an information extractor according to an exemplary embodiment.

FIG. 17 is a block diagram illustrating a structure of an information extractor according to an exemplary embodiment.

According to FIG. 17, the information extractor 1420 includes a demodulator 1421, a multiplexer 1422, a de-interleaver 1423, and a decoder 1424.

The demodulator 1421 receives a signal transmitted from the transmitting apparatus 100 as shown in FIG. 1 and demodulates the received signal. To be specific, the demodulator 1421 generates a value corresponding to an LDPC codeword and outputs the value to the multiplexer 1422.

In this case, the value corresponding to the LDPC codeword may be represented by a channel value with respect to the received signal. Herein, various methods for determining a channel value may exist. As an example, a method for determining a log likelihood ratio (LLR) may be applied.

Herein, the LLR value may be represented by a value where a log is applied to a ratio of probability that a bit transmitted from the transmitting apparatus 100 is 0 and a probability that the bit transmitted from the transmitting apparatus 100 is 1. Alternatively, the LLR value may be a bit value determined according to a hard decision. The LLR value may be a representative value which is determined according to a section to which the probabilities where the bit transmitted from the transmitting apparatus 100 is 0 or 1 belong.

The multiplexer 1422 multiplexes an output value of the demodulator 1421 and outputs the value to the de-interleaver 1423. In this case, the output value of the demodulator 1421 may be a value corresponding to the LDPC codeword, for example, the LLR value.

To be specific, the multiplexer 1422 is a component corresponding to a demultiplexer (see FIG. 7, 1240-2) provided in the transmitting apparatus 100 and may perform a demultiplexing operation performed by the demultiplexer 1240-2 inversely. That is, the multiplexer 1422 parallel-to-serial converts the value corresponding to the LDPC codeword output from the demodulator 1421 and multiplexes the value corresponding to the LDPC codeword.

The de-interleaver 1423 de-interleaves the output value of the multiplexer 14722 and outputs the value to the decoder 1424.

To be specific, the de-interleaver 1423 is a component corresponding to an interleaver (see FIG. 7, 1230-2) provided in the transmitting apparatus 100 and may perform an operation performed by the interleaver (see FIG. 7, 1230-2) inversely. That is, the de-interleaver 1423 may perform a de-interleaving operation with respect to the value corresponding to the LDPC codeword so as to correspond to the interleaving operation performed by the interleaver (see FIG. 7, 1230-2). In this case, the value corresponding to the LDPC codeword may be an LLR value, for example.

The decoder 1424 is a component corresponding to the FEC encoder 1220-2 provided in the transmitting apparatus 100 and may perform an operation performed by the FEC encoder 1220-2 inversely. To be specific, the decoder 1424 may perform a decoding operation based on the de-interleaved LLR value and output the L1 signaling.

Meanwhile, the aforementioned L2 signaling information may include at least one of Multi_Layered Media ID indicating whether the base layer data and the enhancement layer data exist, Number of Layered Media indicating the number of layers, and Multi_Layered Media Information indicating information for identifying the base layer data and the enhancement layer data. The syntax of the L2 signaling information was described in connection with FIG. 6, and thus, the detailed description is omitted.

Figure 18:
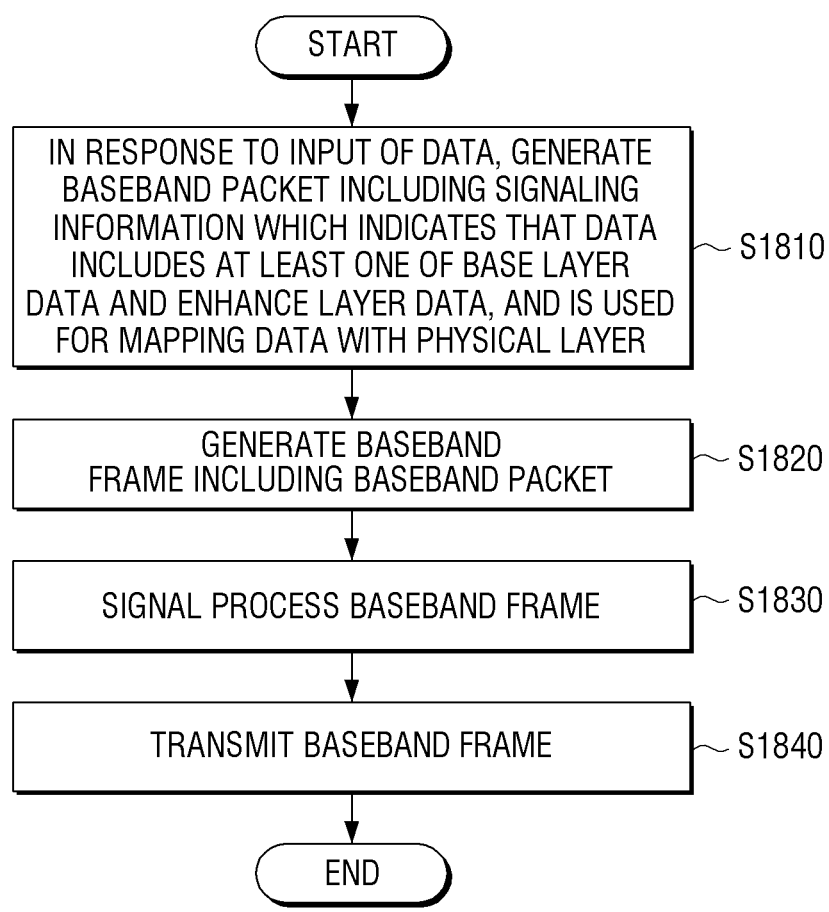
FIG. 18 is a flow chart provided to describe a method of controlling a transmitting apparatus according to an exemplary embodiment.

FIG. 18 is a flow chart provided to describe a method of controlling a transmitting apparatus according to an exemplary embodiment.

According to the method of controlling a transmitting apparatus in FIG. 18, in response to input of data, a baseband packet including signaling information which indicates that the data includes at least one of the base layer data and the enhancement layer data and is used for mapping the data with a physical layer may be generated (S1810).

In this case, referring to FIG. 6, the signaling information includes information which shows whether each of a plurality of baseband frames including at least one of the base layer data and the enhancement layer data is a frame for supporting a mobile terminal device or a frame for supporting a fixed terminal device.

In addition, the signaling information may include at least one of the multilayered Media ID indicating whether the base layer data and the enhancement layer data exist, the Number of Layered Media indicating the number of layers, and the Multi_Layered Media Information indicating information for identifying the base layer data and the enhancement layer data.

In addition, the signaling information may include information on a frequency band corresponding to each of the base layer data and the enhancement layer data.

In this case, the signaling information is the L2 signaling information.

Subsequently, a baseband frame including at least one baseband packet may be generated (S1820).

The generated baseband frame may be signal-processed (S1830).

Subsequently, the signal-processed baseband frame may be transmitted (S1840).

Meanwhile, the method of controlling a transmitting apparatus shown in FIG. 18 may further include inserting L1 signaling information in a signaling area of a baseband frame. Here, the L1 signaling information may include information on a location where the base layer data and the enhancement layer data are inserted in the baseband frame and parameter information on each of the base layer data and the enhancement layer data.

The parameter information may include at least one of an OFDM FFT size, a guard interval, a constellation order, and an FEC code rate.

Figure 19:
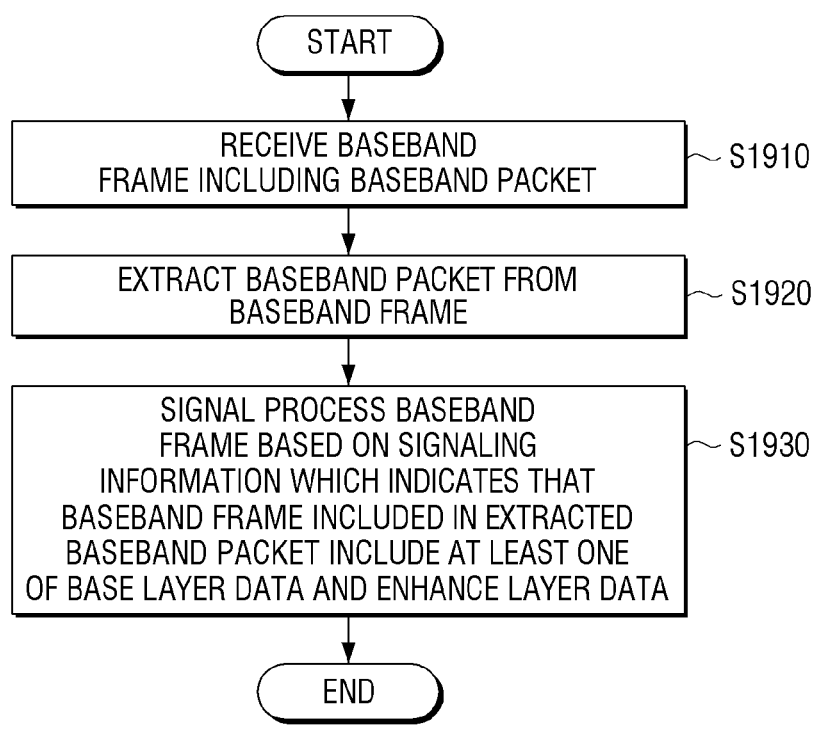
FIG. 19 is a flow chart provided to describe a method of controlling a receiving apparatus according to an exemplary embodiment.

FIG. 19 is a flow chart provided to describe a method of controlling a receiving apparatus according to an exemplary embodiment.

According to the method of controlling a receiving apparatus, a plurality of baseband frames each including at least one baseband packet are received (S1910).

The baseband packet is extracted from a received baseband frame (S1920).

Subsequently, the baseband frame may be signal-processed based on signaling information included in the extracted baseband packet, the signaling information indicating that the baseband frame includes at least one of the base layer data and the enhancement layer data (S1930).

In this case, the signal processing may include determining whether the baseband frame includes the base layer data and the enhancement layer data based on the signaling information, and signal-processing each of the base layer data and the enhancement layer data based on the L1 signaling information included in a signaling area of the baseband frame. Here, the L1 signaling information includes information on a location where the base layer data and the enhancement layer data is inserted in the baseband frame and parameter information on each of the base layer data and the enhancement layer data.

In this case, the signaling information includes information which indicates whether the baseband frame including at least one of the base layer data and the enhancement layer data is a frame for supporting a mobile device or a frame for supporting a fixed device.

In addition, referring to FIG. 6, the signaling information may include at least one of the Multi_Layered Media ID indicating whether the base layer data and the enhancement layer data exist, the Number of Layered Media indicating the number of layers, and the multi_layered media information indicating information for identifying the base layer data and the enhancement layer data.

In addition, the signaling information may include information on a frequency band corresponding to each of the base layer data and the enhancement layer data.

In this case, the signaling information is the L2 signaling information.

Figure 20:
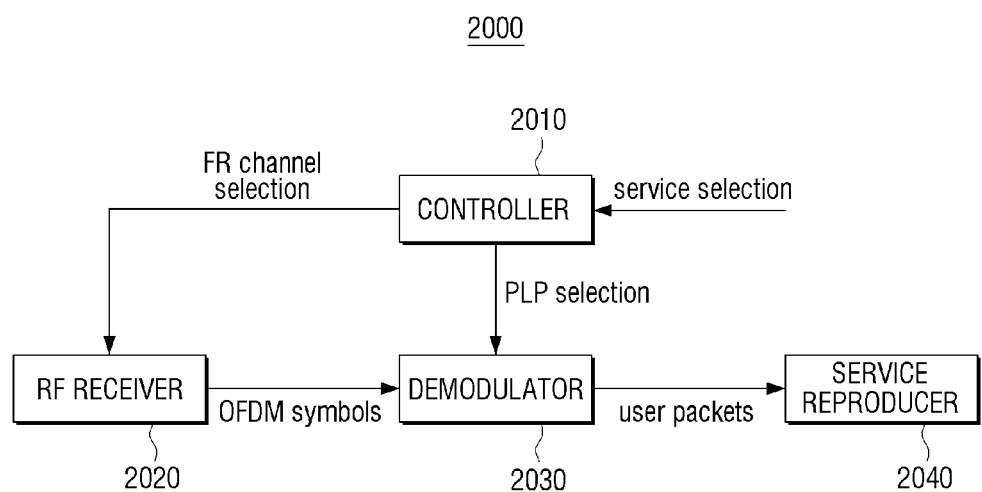
FIG. 20 is a block diagram demonstrating a configuration of a receiving apparatus according to an exemplary embodiment.

FIG. 20 is a block diagram demonstrating a configuration of a receiving apparatus according to an exemplary embodiment.

Referring to FIG. 20, a receiving apparatus 2000 may comprise a controller 2010, an RF receiver 2020, a demodulator 2030 and a service regenerator 2040.

The controller 2010 determines an RF channel and a PLP through which a selected service is transmitted. Here, the RF channel may be specified to a center frequency and a bandwidth, and the PLP may be specified to its PLP ID. A specific service may be transmitted through at least one PLP which falls into at least one RF channel, each PLP constituting a service. Hereinafter, for the sake of convenience of explanation, all of data needed to reproduce one service is transmitted as one PLP which is transmitted through one RF channel. In other words, a service has only one data obtaining path to reproduce the service, and the data obtaining path is specified to a RF channel and a PLP.

The RF receiver 2020 detects an RF signal from an RF channel selected by the controller 2010 and delivers OFDM symbols, which are extracted by performing a signal-processing on an RF signal, to the demodulator 2030. Here, the signal-processing may include synchronization, channel estimation, equalization, etc. Information for signal processing, a value predetermined by the transmitting apparatus 100 (FIG. 1) and the receiving apparatus 2000 according to a use and implementation thereof, is included in a predetermined OFDM symbol among OFDM symbols and then transmitted to the receiving apparatus 2000.

The demodulator 2030 performs signal-processing on the OFDM symbols, extracts user packets and delivers the user packets to a service reproducer 2040, and the service reproducer 2040 uses the user packets to reproduce and then output a service selected by a user. Here, a format of the user packets may differ depending on a service implementation method and may be, for example, a TS packet or an IPv4 packet.

Figure 21:
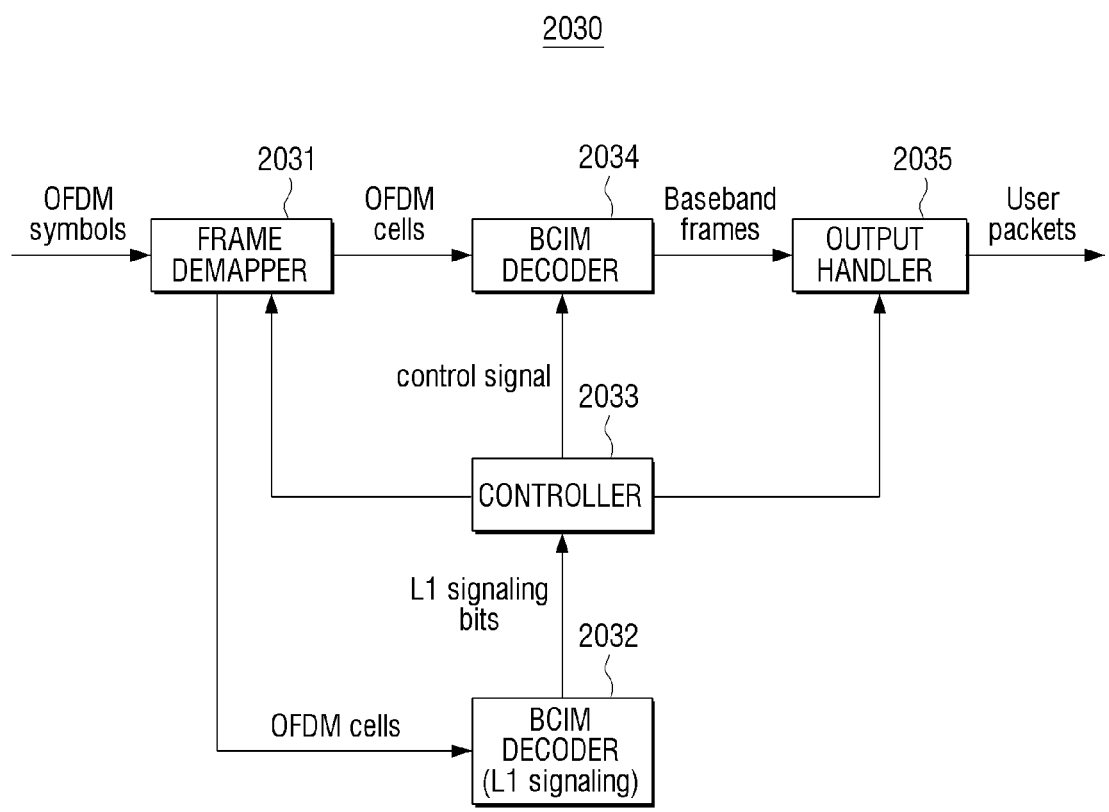
FIG. 21 is a block diagram demonstrating a demodulator 2030 in detail according to an exemplary embodiment.

FIG. 21 is a block diagram demonstrating a demodulator 2030 in detail according to an exemplary embodiment.

Referring to FIG. 21, the demodulator 2030 may include a frame demapper 2031, a BICM decoder for L1 signaling 2032, a controller 2033, a BICM decoder 2034 and output handler 2035.

The frame demapper 2031 selects an OFDM cell constituting FEC blocks which belongs to a PLP selected in a frame including an OFDM symbol, based on control information received from the controller 2033, and outputs the selected OFDM cell to the BICM decoder 2034. The frame demapper 2013 also selects an OFDM cells corresponding to at least one FEC block which includes an L1 signaling, and outputs the OFDM cell to the BICM decoder 2030 for L1 signaling.

The BICM decoder for L1 signaling 2032 signal-processes the OFDM cell corresponding to an FEC block which includes the L1 signaling, extracts L1 signaling bits and output the L1 signaling bits to the controller 2033. In this case, the signal processing may include a process of extracting an LLR value for decoding an LDPC codeword and a process of using the extracted LLR value to decode the LDPC codeword.

The controller 2033 extracts an L1 signaling table from the L1 signaling bits and uses the L1 signaling table value to control operations of the frame demapper 2031, the BICM decoder 2034 and the output handler 2035. FIG. 21 illustrates that the BICM decoder for L1 signaling 2032 does not use control information of the controller 2033. However, when the L1 signaling has a layer structure similar to the layer structure of the above-described an L1-pre signaling and an L1-post signaling, it is obvious that the BICM decoder for L1 signaling 2032 may be formed of at least one BICM decoding block and an operation of the BICM decoding block and the frame demapper 2031 may be controlled by L1 signaling information of an upper layer.

The BICM decoder 2034 signal-processes an OFDM cell corresponding to an FEC block which belongs to a selected PLP to extract a baseband frame and outputs the baseband frame to the output handler 2035. In this case, the signal processing may include a process of extracting an LLR value for decoding an LDPC codeword and a process of using the extracted LLR value to decode the LDPC codeword, which may be performed based on control information received from the controller 2033.

The output handler 2035 signal-processes the baseband frame, extracts a user packet and outputs the extracted user packet to a service reproducer. In this case, the signal processing may be performed based on control information output from the controller 2033.

According to an exemplary embodiment, the L1 signaling includes information on a kind of a user packet transmitted through the corresponding PLP and information on operations used for encapsulating the user packet in a baseband frame. Herein, the information includes control information which the controller 2033 outputs to the output handler 2035. The output handler 2035 extracts a user packet from the baseband frame received based on the control information.

According to an exemplary embodiment, the L1 signaling may include, in particular, information on an ISSY mode, information on a buffer size of a receiver required according to the ISSY mode and information on the time when a first user packet of the PLP included in the frame. This information is included in the control information which the controller 2033 outputs to the output handler 2035. The output handler 2035 stores the control information in a buffer and outputs the user packet to a service reproducer at a predetermined time.

FIG. 22 is a flowchart provided to briefly demonstrate an operation of a receiving apparatus from the moment when a user selects a service until the actually selected service is reproduced, according to an exemplary embodiment.

Service information on selectable services are acquired at an initial scan operation (S2200) prior to a user's service selection (S2210). Here, the service information may include information on an RF channel and a PLP which transmits data required to reproduce a specific service in a current broadcasting system. As an example of the service information, program specific information/service information (PSI/SI) of an MPEG2-TS is available, and may be obtained through an L2 signaling and an upper layer signaling.

In the initial scan operation (S2200), information on a payload type of PLPs which are transmitted through a specific frequency band is obtained. As an example, there may be information on whether a PLP transmitted through the frequency band includes a specific type of data.

When a user selects a service (S2210), the receiving apparatus changes a current frequency to a transmitting frequency and performs RF signal detection (S2230). In this frequency change operation (S2220), the service information may be used.

When an RF signal is detected, the receiving apparatus extracts an L1 signaling from the detected RF signal (S2240). Then, the receiving apparatus selects a PLP through which the selected service is transmitted, using the extracted L1 signaling (S2250), and extracts a baseband frame from the selected PLP (S2260). Also, in this process, the service information may be used.

The operation to extract the baseband frame (S2260) may include an operation to demap a received frame and select an OFDM cell corresponding to the PLP, extract an LLR value for an LDPC codeword from the OFDM cell, and decode the LDPC codeword using the extracted LLR value.

The receiving apparatus, using header information of the extracted baseband frame, extracts a baseband packet from the baseband frame (S2270), and using header information of the extracted baseband packet, extracts a user packet from the extracted baseband packet (S2280). The extracted user packet is used to reproduce the selected service (S2290). In the operations of extracting the baseband packet (S2270) and user packet (S2280), the L1 signaling information acquired in the operation of extracting the L1 signaling (S2240) may be used.

According to an exemplary embodiment, the L1 signaling includes information on a type of a user packet transmitted through the corresponding PLP, and information on an operation used to encapsulate the user packet in the baseband frame. Here, corresponding information may be used in the operation of extracting the user packet (S2280). This information may have been used in an operation of encapsulating the user packet in the baseband frame at the transmitting apparatus which is a reverse operation of the operation of extracting the user packet.

According to an exemplary embodiment, the L1 signaling may include information on an ISSY mode, a buffer size of the receiving apparatus required based on the ISSY mode information, and an output time of a first user packet of a corresponding PLP included in the frame. Here, corresponding information may be used to control the buffer of the receiving apparatus in the operation of extracting the user packet (S2280). Specifically, this information may be used to control the buffer size to buffer the extracted user packet and the time to output the user packet at a service reproducer.

A non-transitory computer readable medium including a program for performing the above-described controlling methods may be provided, according to an exemplary embodiment.

As an example, there may be provided a non-transitory computer readable medium including a program for performing, in response to input of data, generating a baseband packet including signaling information which indicates that the data includes at least one of the base layer data and the enhancement layer data and is used for mapping the data with a physical layer, generating a baseband frame including a baseband packet, and signal processing the baseband frame.

As another example, there may be provided a non-transitory computer readable medium including a program for performing extracting a baseband packet from a baseband frame and signal processing the baseband frame based on signaling information which indicates that the baseband frame includes at least one of the base layer data and the enhancement layer data.

The non-transitory computer readable medium refers to a medium which may store data semi-permanently rather than storing data for a short time such as a register, a cache, and a memory and may be readable by an apparatus. Specifically, the above-described various applications and programs may be stored in the non-transitory computer readable medium like a compact disc (CD), a digital versatile disk (DVD), a hard disk, a Blu-ray disk, a universal serial bus (USB), a memory card, and a read-only memory (ROM), etc., and provided therein.

The components, units or elements (hereafter collectively referred to as "elements") represented by a block as illustrated in FIGS. 1, 2, 3, 7 and 14-17 may be embodied as various numbers of hardware, software and/or firmware structures that execute respective functions described above, according to an exemplary embodiment. For example, these elements may use a direct circuit structure, such as a memory, a processor, a look-up table, etc. that may execute the respective functions through controls of one or more microprocessors or other control apparatuses. Also, these elements may be specifically embodied by a program or a part of code, which contains one or more executable instructions for performing specified logic functions. Also, at least one of these elements may further include a processor such as a central processing unit (CPU) that performs the respective functions, a microprocessor, or the like. Although a bus is not illustrated in the above block diagrams, communication between the respective blocks may be performed via the bus.

As given above, although various exemplary embodiments have been shown and described, the inventive concept is not limited to these exemplary embodiments, and could be variously modified and achieved by those skilled in the art to which the inventive concept pertains without deviating from the substance of the inventive concept which is claimed in the claims, and such modifications should not be understood separately from the technical concept or prospect of the inventive concept.

What is claimed is:

1. A transmitting apparatus comprising:
    a baseband packet generator configured to, in response to input of data, generate a baseband packet for mapping the data with a physical layer;
    a baseband frame generator configured to generate a baseband frame comprising the baseband packet;
    a signal processor configured to signal-process the baseband frame; and
    a transmitter configured to transmit the baseband frame after the signal processing,
    wherein the baseband packet comprises signaling information which indicates that the data comprises at least one of base layer data and enhancement layer data, and
    wherein the signaling information comprises information which indicates whether the baseband frame comprising at least one of the base layer data and the enhancement layer data is a frame for supporting a mobile device or a frame for supporting a fixed device.

2. The transmitting apparatus of claim 1, wherein the signaling information comprises at least one of information on whether the base layer data and the enhancement layer data exist, information on a number of layers where the data exist, and information required for identifying the base layer data and the enhancement layer data.

3. The transmitting apparatus of claim 1, wherein the signaling information comprises frequency band information corresponding to each of the base layer data and the enhancement layer data.

4. The transmitting apparatus of claim 1, wherein the signaling information is L2 signaling information.

5. The transmitting apparatus of claim 1, further comprising:
    an information inserter configured to insert L1 signaling information in a signaling area of the baseband frame,
    wherein the L1 signaling information comprises information on a location where the base layer data and the enhancement layer data are inserted in the baseband frame and parameter information on each of the base layer data and the enhancement layer data.

6. The transmitting apparatus of claim 5, wherein the parameter information comprises at least one of an Orthogonal Frequency Division Multiplexing fast Fourier transform size, a guard interval, a constellation order, and a forward error correction code rate.

7. A receiving apparatus comprising:
    a receiver configured to receive a baseband frame comprising a baseband packet;
    an information extractor configured to extract the baseband packet from the baseband frame; and
    a signal processor configured to signal-process the baseband frame based on signaling information included in the baseband packet,
    wherein the signaling information indicates that the baseband frame comprises at least one of base layer data and enhancement layer data, and
    wherein the signaling information comprises information which indicates whether the baseband frame comprising at least one of the base layer data and the enhancement layer data is a frame for supporting a mobile device or a frame for supporting a fixed device.

8. The receiving apparatus of claim 7, wherein the signal processor determines whether the baseband frame comprises the base layer data and the enhancement layer data based on the signaling information, and signal-processes each of the base layer data and the enhancement layer data based on L1 signaling information included in a signaling area of the baseband frame, and wherein the L1 signaling information comprises information on a location where the base layer data and the enhancement layer data are inserted in the baseband frame and parameter information on each of the base layer data and the enhancement layer data.

9. The receiving apparatus of claim 7, wherein the signaling information comprises at least one of information on whether the base layer data and the enhancement layer data exist, information on a number of layers where the data exist, and information required for identifying the base layer data and the enhancement layer data.

10. The receiving apparatus of claim 7, wherein the signaling information comprises frequency band information corresponding to each of the base layer data and the enhancement layer data.

11. The receiving apparatus of claim 7, wherein the signaling information is L2 signaling information.

12. A method of controlling a transmitting apparatus, the method comprising:

in response to input of data, generating a baseband packet for mapping the data with a physical layer;

generating a baseband frame comprising the baseband packet;

signal processing the baseband frame; and transmitting the baseband frame after the signal processing, wherein the baseband packet comprises signaling information which indicates that the data comprises at least one of base layer data and enhancement layer data, and wherein the signaling information comprises information indicating whether the baseband frame comprising at least one of the base layer data and the enhancement layer data is a frame for supporting a mobile device or a frame for supporting a fixed device.

13. The method of claim 12, wherein the signaling information comprises at least one of information on whether the base layer data and the enhancement layer data exist, information on a number of layers, and information required for identifying the base layer data and the enhancement layer data.

14. The method of claim 12, wherein the signaling information comprises frequency band information corresponding to each of the base layer data and the enhancement layer data.

15. The method of claim 12, wherein the signaling information is L2 signaling information.

16. The method of claim 12, further comprising:

inserting L1 signaling information in a signaling area of the baseband frame, wherein the L1 signaling information comprises information on a location where the base layer data and the enhancement layer data are inserted in the baseband frame and parameter information on each of the base layer data and the enhancement layer data.

17. A method of controlling a receiving apparatus, the method comprising:

receiving a baseband frame comprising a baseband packet;

extracting the baseband packet from the baseband frame; and signal processing the baseband frame based on signaling information included in the baseband packet, wherein the signaling information indicates that the baseband frame comprises at least one of base layer data and enhancement layer data, and wherein the signaling information comprises information which indicates whether the baseband frame comprising at least one of the base layer data and the enhancement layer data is a frame for supporting a mobile device or a frame for supporting a fixed device.

* * * * *